(12) United States Patent
Huang

(10) Patent No.: US 10,532,440 B2
(45) Date of Patent: Jan. 14, 2020

(54) FISHING POLE GRIP MODIFICATION SYSTEM AND METHOD OF USING SAME

(71) Applicant: Ben Huang, Huntington Beach, CA (US)

(72) Inventor: Ben Huang, Huntington Beach, CA (US)

(*) Notice: Subject to any disclaimer, the term of this patent is extended or adjusted under 35 U.S.C. 154(b) by 263 days.

(21) Appl. No.: 15/794,332

(22) Filed: Oct. 26, 2017

(65) Prior Publication Data

US 2018/0154494 A1 Jun. 7, 2018

Related U.S. Application Data

(62) Division of application No. 14/671,745, filed on Mar. 27, 2015, now Pat. No. 9,827,645.

(Continued)

(51) Int. Cl.
*B24B 27/06* (2006.01)
*A01K 87/08* (2006.01)
(Continued)

(52) U.S. Cl.
CPC .............. *B24B 27/06* (2013.01); *A01K 87/08* (2013.01); *B24B 27/0076* (2013.01); *B24B 27/0675* (2013.01); *B29C 63/0013* (2013.01); *A63B 53/14* (2013.01); *A63B 60/06* (2015.10); *A63B 60/14* (2015.10); *B24B 27/003* (2013.01); *B24B 27/0616* (2013.01); *B26D 1/01* (2013.01); *B26D 1/04* (2013.01); *B29C 63/18* (2013.01); *B29L 2031/463* (2013.01);
(Continued)

(58) Field of Classification Search
CPC .......... Y10T 156/11; B32B 38/10; B26D 1/01; B26D 1/04; B29C 63/0013; A01K 87/08; A63B 53/14; A63B 60/06; A63B 60/14; B29L 2031/463; B29L 2031/5227
See application file for complete search history.

(56) References Cited

U.S. PATENT DOCUMENTS 5,636,560 A * 6/1997 Paul ...................... B26D 1/04
30/90.4
5,771,552 A 6/1998 Karner et al.
(Continued)

OTHER PUBLICATIONS

U.S. Appl. No. 09/901,747, filed Jul. 9, 2001, Huang, (U.S. Pub. No. 2001/0046905, published Nov. 29, 2001), abandoned.
(Continued)

*Primary Examiner* — Carson Gross
(74) *Attorney, Agent, or Firm* — Knobbe, Martens, Olson & Bear, LLP

(57) ABSTRACT

In certain embodiments, a system is provided for the efficient removal of an old grip from a fishing pole while maintaining the integrity of the pole. The system can include a removal portion including one or more rotational assemblies that rotate one or more grinding members. The grinding members can include a rotational blade with a centering rod. The rotational assembly can remove the old grip while maintaining the integrity of the rod within. The system can include multiple sets of grinding members that are organized for efficient identification or may include adjustable grinding members that can be configured for specific rods. The system can further include a guide to help identify particular grinding members for use with particular fishing poles.

20 Claims, 21 Drawing Sheets

Related U.S. Application Data

(60) Provisional application No. 61/971,460, filed on Mar. 27, 2014.

(51) Int. Cl.

| | | |
|---|---|---|
| *B24B 27/00* | (2006.01) | |
| *B29C 63/00* | (2006.01) | |
| *A63B 60/14* | (2015.01) | |
| *A63B 53/14* | (2015.01) | |
| *B32B 38/10* | (2006.01) | |
| *B29L 31/52* | (2006.01) | |
| *B29L 31/46* | (2006.01) | |
| *B29C 63/18* | (2006.01) | |
| *A63B 60/06* | (2015.01) | |
| *B26D 1/01* | (2006.01) | |
| *B26D 1/04* | (2006.01) | |

(52) U.S. Cl.
CPC ....... *B29L 2031/5227* (2013.01); *B32B 38/10* (2013.01); *Y10T 156/11* (2015.01)

(56) References Cited

U.S. PATENT DOCUMENTS

| | | |
|---|---|---|
| 7,770,321 B2 | 8/2010 | Huang |
| 8,518,505 B2 | 8/2013 | Huang |
| 8,590,205 B2 | 11/2013 | Huang |
| 2014/0366327 A1 | 12/2014 | Huang |

OTHER PUBLICATIONS

U.S. Appl. No. 10/167,216, filed Jun. 11, 2002, now U.S. Pat. No. 7,137,904, issued Nov. 21, 2006, Huang.
U.S. Appl. No. 10/348,389, filed Jan. 21, 2003, now U.S. Pat. No. 6,733,401, issued May 11, 2004, Huang.
U.S. Appl. No. 10/392,480, filed Mar. 18, 2003, now U.S. Pat. No. 6,857,971, issued Feb. 22, 2005, Huang.
U.S. Appl. No. 10/746,764, filed Dec. 23, 2003, now U.S. Pat. No. 6,843,732, issued Jan. 18, 2005, Huang.
U.S. Appl. No. 10/608,598, filed Jun. 27, 2003, Huang (U.S. Pub. No. 2004-0266546, published Dec. 30, 2004), abandoned.
U.S. Appl. No. 10/785,379, filed Feb. 24, 2004, now U.S. Pat. No. 7,374,498, issued May 20, 2008, Huang.
U.S. Appl.No. 10/827,095, filed Apr. 19, 2004, now U.S. Pat. No. 7,195,568, issued Mar. 27, 2007, Huang.
U.S. Appl. No. 10/875,035, filed Jun. 23, 2004, now U.S. Pat. No. 7,585,230, issued Sep. 8, 2009, Huang.
U.S. Appl. No. 11/029,328, filed Jan. 5, 2005, Huang (U.S. Pub. No. 2005-0148401, published Jul. 7, 2005), abandoned.
U.S. Appl. No. 11/062,046, filed Feb. 18, 2005, now U.S. Pat. No. 7,470,199, issued Dec. 30, 2008, Huang.
U.S. Appl. No. 11/131,832, filed May 18, 2005, now U.S. Pat. No. 7,527,564, issued May 5, 2009, Huang.
U.S. Appl. No. 11/172,770, filed Jul. 1, 2005, now U.S. Pat. No. 7,186,189, issued Mar. 6, 2007, Huang.
U.S. Appl. No. 11/412,196, filed Apr. 25, 2006, Huang (U.S. Pub. No. 2006-0264268, published Nov. 23, 2006), abandoned.
U.S. Appl. No. 11/416,364, filed May 1, 2006, now U.S. Pat. No. 7,438,646, issued Oct. 21, 2008, Huang.
U.S. Appl. No. 12/425,187, filed Apr. 16, 2009, Huang (U.S. Pub. No. 2009-0258722, published Oct. 15, 2009), abandoned.
U.S. Appl. No. 11/413,411, filed Apr. 28, 2006, now U.S. Pat. No. 7,344,448, issued Mar. 18, 2008, Huang.
U.S. Appl. No. 11/438,808, filed May 22, 2006, now U.S. Pat. No. 7,347,792, issued Mar. 25, 2008, Huang.
U.S. Appl. No. 11/417,643, filed May 3, 2006, now U.S. Pat. No. 7,448,957, issued Nov. 11, 2008, Huang.
U.S. Appl. No. 11/417,623, filed May 3, 2006, now U.S. Pat. No. 7,566,375, issued Jul. 28, 2009, Huang.
U.S. Appl. No. 11/417,555, filed May 3, 2006, now U.S. Pat. No. 7,404,770, issued Jul. 29, 2008, Huang.
U.S. Appl. No. 11/417,401, filed May 3, 2006, now U.S. Pat. No. 7,491,133, issued Feb. 17, 2009, Huang.
U.S. Appl. No. 11/682,264, filed Mar. 5, 2007, now U.S. Pat. No. 7,980,961, issued Jul. 19, 2011, Huang.
U.S. Appl. No. 11/417,696, filed Mar. 5, 2006, now U.S. Pat. No. 7,448,958, issued Nov. 11, 2008, Huang.
U.S. Appl. No. 12/045,639, filed Mar. 10, 2008, now U.S. Pat. No. 7,770,321, issued Aug. 10, 2010, Huang.
U.S. Appl. No. 11/689,452, filed Mar. 21, 2007, now U.S. Pat. No. 7,862,445, issued Jan. 4, 2011, Huang.
U.S. Appl. No. 12/123,384, filed May 19, 2008, now U.S. Pat. No. 7,985,314, issued Jul. 26, 2011, Huang.
U.S. Appl. No. 11/838,670, filed Aug. 14, 2007, now U.S. Pat. No. 7,862,446, issued Jan. 4, 2011, Huang.
U.S. Appl. No. 12/055,289, filed Mar. 25, 2008, now U.S. Pat. No. 8,003,171, issued Aug. 23, 2011, Huang.
U.S. Appl. No. 12/426,896, filed Apr. 20, 2009, Huang (U.S. Pub. No. 2009-0258721, published Oct. 15, 2009), abandoned.
U.S. Appl. No. 12/753,804, filed Apr. 2, 2010, Huang (U.S. Pub. 2010-0269626, published Oct. 28, 2010), pending.
U.S. Appl. No. 12/753,669, filed Apr. 2, 2010, now U.S. Pat. No. 8,518,505, issued Aug. 27, 2013, Huang.
U.S. Appl. No. 12/753,799, filed Apr. 2, 2010, Huang (U.S. Pub. 2010-0273568, published Oct. 28, 2010), abandoned.
U.S. Appl. No. 12/753,773, filed Apr. 2, 2010, now U.S. Pat. No. 8,424,236, issued Apr. 23, 2013, Huang.
U.S. Appl. No. 12/767,736, filed Apr. 26, 2010, now U.S. Pat. No. 8,360,898, issued Jan. 29, 2013, Huang.
U.S. Appl. No. 12/511,033, filed Jul. 28, 2009, now U.S. Pat. No. 8,435,133, issued May 7, 2013, Huang.
U.S. Appl. No. 12/848,052, filed Jul. 30, 2010, now U.S. Pat. No. 8,201,357, issued Jun. 19, 2012, Huang.
U.S. Appl. No. 12/862,673, filed Aug. 24, 2010, now U.S. Pat. No. 8,480,510, issued Jul. 9, 2013, Huang.
U.S. Appl. No. 12/948,637, filed Nov. 17, 2010, now U.S. Pat. No. 8,590,205, issued Nov. 26, 2013, Huang.
U.S. Appl. No. 12/960,261, filed Dec. 3, 2010, now U.S. Pat. No. 8,123,627, issued Feb. 28, 2012, Huang.
U.S. Appl. No. 13/208,297, filed Aug. 11, 2011, now U.S. Pat. No. 8,617,664, issued Dec. 31, 2013, Huang.
U.S. Appl. No. 13/403,764, filed Feb. 23, 2012, now U.S. Pat. No. 8,845,448, issued Sep. 30, 2014, Huang.
Design U.S. Appl. No. 29/416,672, filed Mar. 26, 2012, now U.S. Pat. No. D. 679,352, issued Apr. 2, 2013, Huang.
U.S. Appl. No. 13/526,323, filed Jun. 18, 2012, now U.S. Pat. No. 8,499,487, issued Aug. 6, 2013, Huang.
Design U.S. Appl. No. 29/436,610, filed Nov. 7, 2012, now U.S. Pat. No. D. 696,368, issued Dec. 24, 2013, Huang.
U.S. Appl. No. 13/750,853, filed Jan. 25, 2013, Huang (U.S. Pub. 2013-0344978, published Dec. 26, 2013), pending.
U.S. Appl. No. 13/866,911, filed Apr. 19, 2013, now U.S. Pat. No. 8,966,809, issued Mar. 3, 2015, Huang.
U.S. Appl. No. 13/874,889, filed May 1, 2013, Huang (U.S. Pub. 2014-0041794, published Feb. 13, 2014), pending.
U.S. Appl. No. 13/916,519, filed Jun. 12, 2013, Huang, (U.S. Pub. 2014-0366327, published Dec. 18, 2014), pending.
U.S. Appl. No. 13/931,647, filed Jun. 28, 2013, now U.S. Pat. No. 8,734,267, issued May 27, 2014, Huang.
U.S. Appl. No. 13/958,211, filed Aug. 2, 2013, Huang, abandoned.
U.S. Appl. No. 13/972,751, filed Aug. 21, 2013, Huang (U.S. Pub. 2014-0090770, published Apr. 3, 2014), pending.
U.S. Appl. No. 14/137,735, filed Dec. 20, 2013, Huang (U.S. Pub. 2014-0338594, published Nov. 20, 2014), pending.
U.S. Appl. No. 14/285,390, filed May 22, 2014, Huang (U.S. Pub. 2015-0013109, published Jan. 15, 2015), pending.
U.S. Appl. No. 14/497,797, filed Sep. 26, 2014, Huang, pending.
U.S. Appl. No. 14/726,093, filed May 29, 2015, Huang, pending.
U.S. Appl. No. 14/809,072, filed Jul. 24, 2015, Huang, pending.

\* cited by examiner

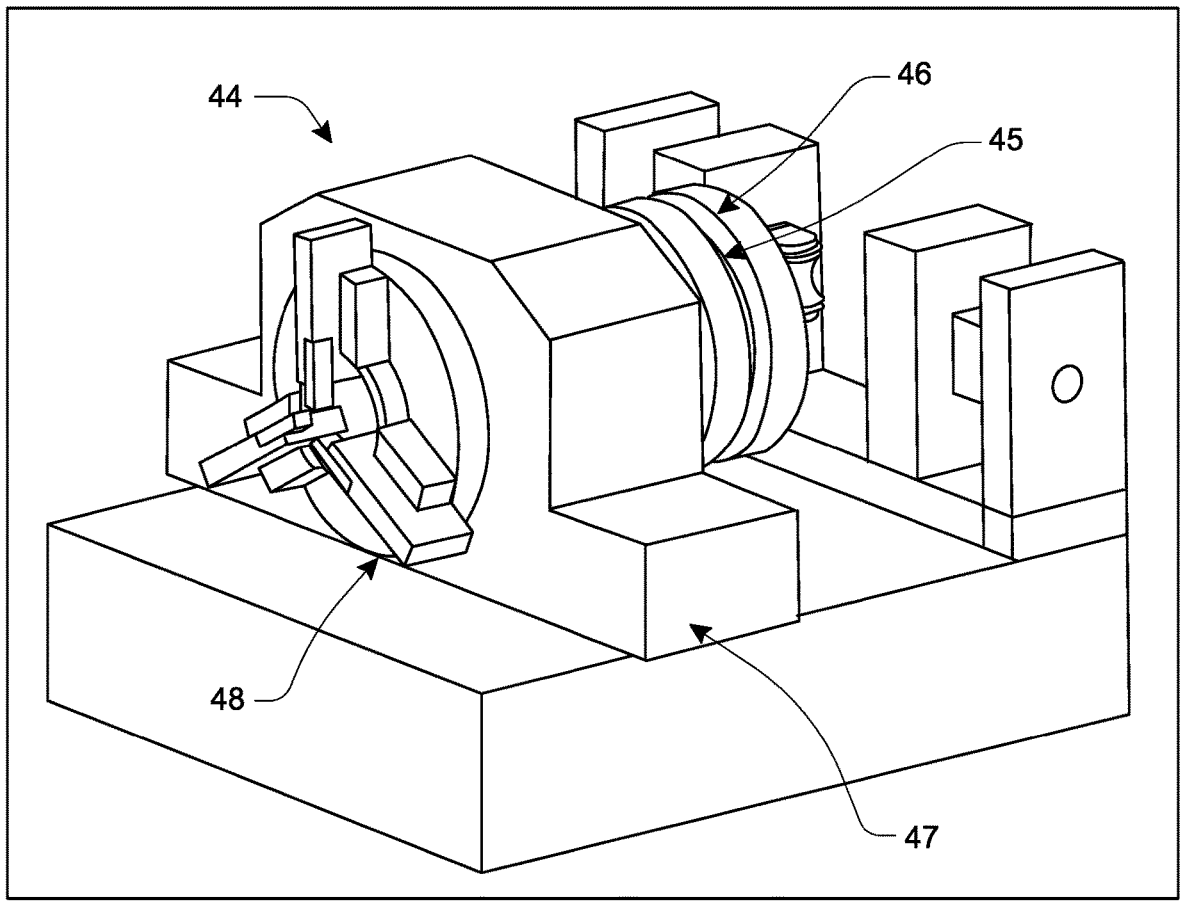
FIG. 6
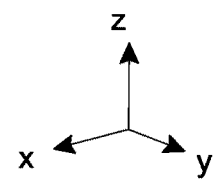

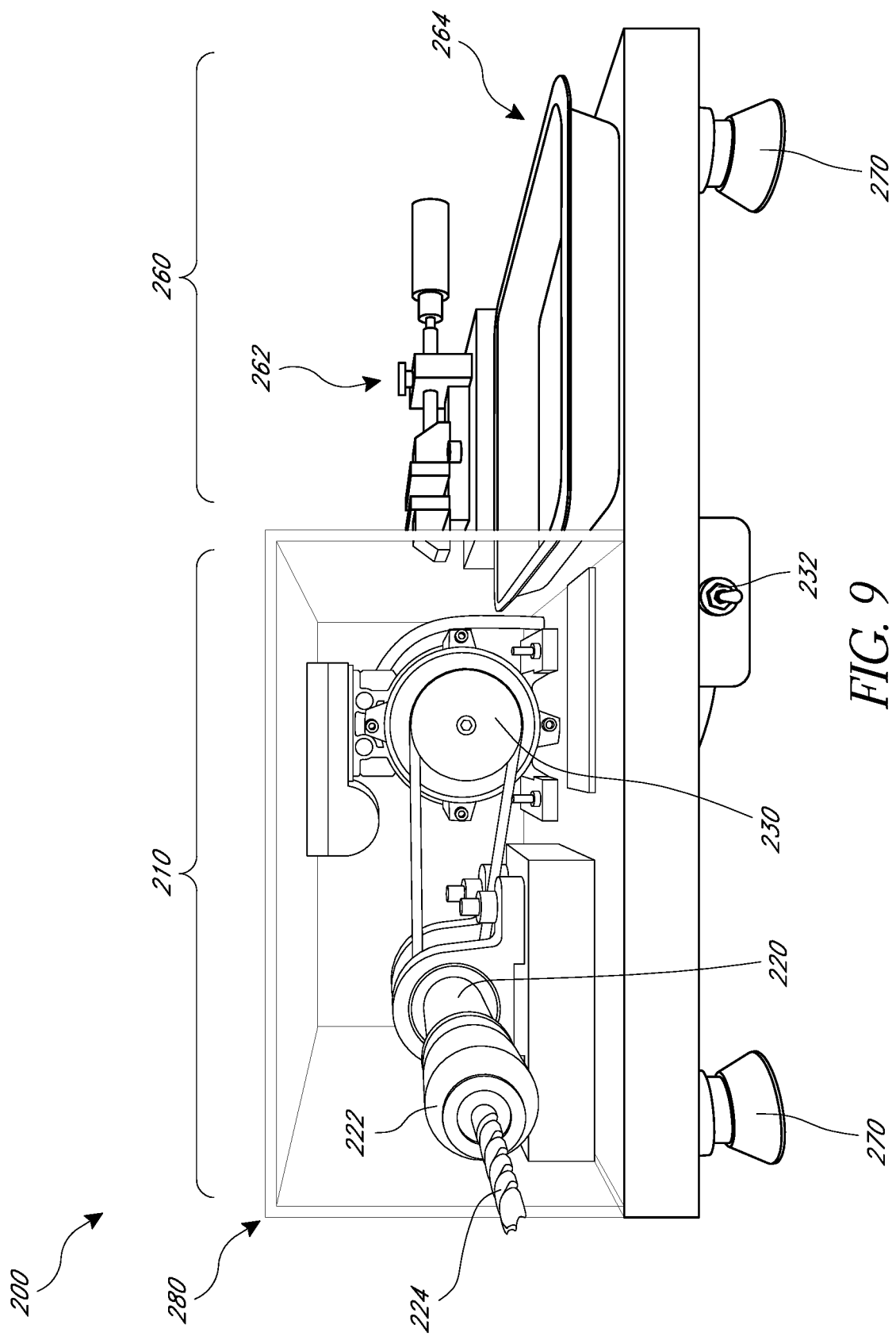

| Chart | Category of blade/bit | | |
|---|---|---|---|
| Product | A | B | C |
| Brand A | | | |
| Model 1 | X | | |
| Model 2 | | | X |
| Brand B | | | |
| Model 1 | X | | |
| Model 2 | | X | |
| | | | |
| | | | |

FISHING POLE GRIP MODIFICATION SYSTEM AND METHOD OF USING SAME

CROSS-REFERENCE TO RELATED APPLICATIONS

The present application is a divisional of U.S. application Ser. No. 14/671,745, filed Mar. 27, 2015, (entitled "FISHING POLE GRIP MODIFICATION SYSTEM AND METHOD OF USING SAME"), which claims the benefit of U.S. Provisional Patent Application No. 61/971,460, filed Mar. 27, 2014 (entitled "FISHING POLE GRIP REMOVER"), the disclosure being hereby incorporated by reference in its entirety.

BACKGROUND OF THE INVENTION

Field of the Invention

Certain embodiments disclosed herein relate to systems and methods to facilitate the modification or change to the handle portions of articles, and more particularly to the removal of previously installed fishing pole grips from the handle of the fishing pole and/or the installation of a new grip onto a fishing pole.

Description of the Related Art

There are many fishing poles used in the sport of fishing. The most common grips have utilized ethylene vinyl acetate or cork to provide a gripping surface. They are typically applied to the handle portion of the rod in a method that is intended to permanently bond the grip to the rod (e.g. require the grip to be destroyed to be removed).

However, new improvements to grips have introduced previously unavailable opportunities to enhance various visual and performance aspects of fishing pole grips. To take advantage of these new grips, a system and method is needed to remove the old permanently bonded grips from the rods in an effective and efficient manner and to introduce new grips to the rods.

SUMMARY OF THE INVENTION

In some embodiments, a method is provided for removing an old grip from a fishing pole without destroying the underlying rod. The method can include the step of guiding the rod with the old grip through a removal blade to remove the majority of the old grip and grinding the majority of any remaining grip material from the rod to create a base to support a new grip. Such base may be substantially smooth. The method can further include grinding or drilling a hole at the end of the old grip prior to guiding the rod through the removal blade.

In some embodiments, a method is provided for removing an old grip from a fishing pole without destroying the underlying rod and introducing a new grip to replace the old grip. The method can includes the step of guiding the rod with the old grip through a removal blade to remove the majority of the old grip. The method can also include subsequent grinding of any remaining grip material from the rod to create a substantially smooth surface at the handle portion of the rod. An adhesive agent, for example double sided tape, can be applied to the handle portion of the rod. A grip installation solution can be applied to the tape to facilitate application of a new grip onto the handle portion of the rod and a new grip can be slid over to the handle portion.

In some embodiments, a method is provided for removing an old grip from a fishing pole without destroying the underlying rod. The method can include the step of guiding the rod with the old grip through a removal blade to remove the majority of the old grip to create a base which may be substantially smooth. The method can further include grinding or drilling a hole at the end of the old grip prior to guiding the rod through the removal blade.

In some embodiments, a method is provided for removing an old grip from a fishing pole without destroying the underlying rod and introducing a new grip to replace the old grip. The method can includes the steps of guiding the rod with the old grip through a removal blade to remove the majority of the old grip to create a substantially smooth surface at the handle portion of the rod. The method can further include grinding or drilling a hold at the end of the old grip prior to guiding the rod through the removal blade. An adhesive agent, for example double sided tape, can be applied to the handle portion of the rod. A grip installation solution can be applied to the tape to facilitate application of a new grip onto the handle portion of the rod and a new grip can be slid over to the handle portion.

In some embodiments, a system is provided for removing an old grip from a fishing pole as shown in the figures. The system can include a removal portion configured to facilitate the removal of an old grip. The removal portion can include a rotational assembly configured to rotate one or more grinding members at one or more speeds. The grinding members can include drill bits and/or blades. The blades can be configured to include a centering post and a radially displaced blade component. The centering post can extend through a mounting portion of the rotational assembly and may be rotationally or slideably coupled to a support bracket positioned on the opposite side of the rotational assembly from the blade component.

In some embodiments, the system can also include a grip mounting portion. The grip mounting portion can include a catch basin and a mounting bracket configured to accommodate rods of different dimensions and suspend a handle portion of the rod over the catch basin.

In some embodiments of the system, a set of one or more grinding members is included. The set of grinding members can be organized into groups that are configured to work with one or more models of fishing poles.

In some embodiments of the system, a guide for coordinating particular grinding members with particular fishing poles is provided.

In some other embodiments, a system is provided which includes one or more grinding members, a rotational assembly, a drive assembly, and a centering post. The rotation assembly may be configured to couple to the one or more grinding members. The drive assembly may be configured to drive the rotational assembly to rotate the one or more grinding members. The centering post may extend through the rotational assembly and be mounted to a mounting bracket.

In some embodiments, the system can include two or more mounting points that can be adjusted to secure a rod on either side of the handle portion of the rod. The two or more mounting points can be fixed relative to each other and can subsequently be moved through the grinding members.

In some embodiments of the system, the grinding blades are radially disposed around the centering post, wherein a space between the grinding blades and the centering post can accommodate the shaft of a fishing pole.

In some embodiments the system may further comprise a mounting portion to facilitate the application of a new grip to a fishing pole rod.

In some embodiments of the system, a first of the one or more grinding members may comprise a drill bit for removing a rear portion of the grip from a fishing pole, the one or more grinding blades radially disposed around central axis, a centering post extending along the central axis, a brush for removing a residual portion of the grip from the fishing pole remaining after a main portion of the grip has been removed, and/or one or more drill and blade pairs configured for use with fishing poles having rods of particular internal and external dimensions.

In some embodiments the system includes an organizational system for holding said grinding members in particular locations facilitating easy selection. The system may include a guide configured to identify particular grinding blades for use with fishing poles having rods of particular dimensions.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

FIG. 6 is a perspective view of components in an embodiment of a system for modifying an assembly.

FIG. 9 is perspective view of components in an embodiment of a system for modifying an assembly.

FIG. 10B is a schematic view of a component in an embodiment of a system for modifying an assembly.

DETAILED DESCRIPTION OF THE PREFERRED EMBODIMENT

Figure 1A:
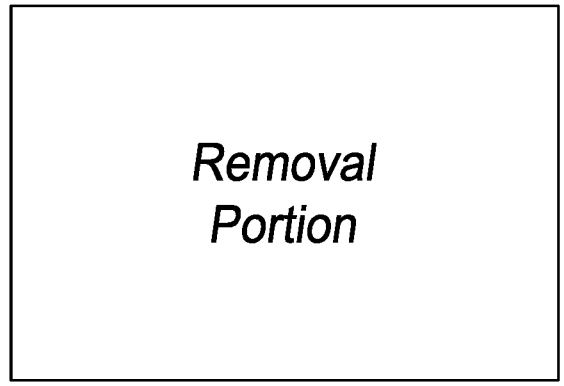
FIG. 1A schematically illustrates a system for modifying an assembly.

There are many fishing poles used in the sport of fishing. The most common grips have utilized ethylene vinyl acetate or cork to provide a gripping surface. They are typically applied to the handle portion of the rod in a method that is intended to permanently bond the grip to the rod (e.g. require the grip to be destroyed to be removed).

However, new improvements to grips have introduced previously unavailable opportunities to enhance various visual and performance aspects of fishing pole grips. To take advantage of these new grips, a system and method is needed to remove the old permanently bonded grips from the rods in an effective and efficient manner and to introduce new grips to the rods.

In one embodiment disclosed herein, a system is provided which is configured to remove an old grip from a fishing rod, for example one made out of cork or ethylene vinyl acetate. The system may include one or more grinding members configured to grind the old grip from the shaft of the handle of a fishing rod. The grinding members may include blades which are rotated against or near the shaft of the rod to scrape away the old unwanted grip and other components in the gripping section. The grinding members may be adjustable to allow for use with a number of brands and models of fishing poles. In some embodiments, instead of adjustable grinding members, a plurality of grinding members may be provided which can be replaceably attached to a rotating drive depending on the diameter of the shaft of a fishing rod.

In some embodiments, in the first step of removing a grip from a fishing rod a user may reveal the inner and outer diameters of the butt of the handle of the rod. The user may expose the inner and outer diameters of the butt of the handle by drilling a hole through the grip into the hollow portion of the shaft of the fishing rod. The user may also grind the rear portion of the grip to reveal the entire butt of the shaft. The user may choose to use another tool to completely remove and expose the end portion of the shaft.

The user may then configure the grip removal system to grind the remaining portion of the old grip from the handle of the fishing rod. In some embodiments this is done by selecting a grinding member with a diameter corresponding to the outer diameter of the fishing rod. In some embodiments, an adjustable grinding member is configured such that grinding blades or other grinding elements are adjusted to correspond to the outer dimension of the shaft of the fishing rod such that a majority, generally, of the old grip is removed. For example, the blades of a grinding member may be tightened to contact the outer surface of the fishing rod and then secured in place. In some embodiments, a centering post is also selected for guiding the fishing rod through the grinding process. In some embodiments, the centering post may be selected to be slightly smaller than the inner diameter of the fishing rod. This allows the rod to be guided while accounting for possible tapering of the fishing rod which would prevent a larger centering rod from passing into the rod while grinding the old grip.

In some embodiments, the fishing rod may be secured in alignment with the grinding member and mechanically advanced into engagement with the grinding member such that the grip is removed as the rear of the fishing rod is advanced into the grinding member. The fishing rod may be mechanically advanced into the grinding member based on user interaction such as feeding the rod in or turning a crank or other mechanism which advances the handle into the grinding member. In some embodiments, the process of advancing the rod into the grinding member is automated. For example, one or more motors may advance the handle of the fishing rod into the grinding member to remove the old grip.

Some fishing grips have several portions. For example, a grip for a fishing pole may have a combination of one or more of a fore grip, a rear grip, and a butt grip. The handle portion of a fishing rod may also include a reel seat configured to secure a fishing reel to the shaft of the fishing rod. Some fishing rods have a simple plastic reel seat. In some embodiments of the grip removal systems and methods disclosed herein are configured to remove the reel seat from the shaft of the fishing rod with the old fishing grip or grips. This enables the user to remove the fore grip along with a rear grip and/or butt grip. In some situations, the reel seat may be a metal clamp, which a user may remove before grinding away the old grip.

After removing the old grip, a user may apply a new grip to the fishing rod. The new grip may be applied through a grip mounting portion of the systems disclosed herein. Such grip mounting portion can be part of a single system or may be a separate system. Some fishing rods have a slight taper. In such situations, the grip may be almost completely removed from the rearmost portion of the shaft of the fishing rod, while some residual portion of the grip will remain further up the shaft. A user may choose to remove this portion with additional grinding or scraping, or may leave the residual portion of the grip on the shaft of the pole. For example, some new grips have a parallel internal configuration with no taper. In such situations, leaving the residual grip on the tapered portion of the shaft may act as a base to provide a better surface to bind the new grip to with no gaps due to the taper. In some embodiments, the grip portion may be applied with the use of double sided tape and lubricant to allow the grip to slide onto the tape. When the lubricant dries, the grip is then secured to the shaft of the fishing pole and ready to use. Other ways of binding the new grip to the rod may also be used.

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

The drawings showing certain embodiments can be semi-diagrammatic and not to scale and, particularly, some of the dimensions are for the clarity of presentation and are shown greatly exaggerated in the drawings.

For expository purposes, the term "horizontal" as used herein is defined as a plane parallel to the plane or surface of the floor of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

As shown schematically in FIG. 1A, in some embodiments a system can be provided for the removal of an old grip from the rod of a fishing pole.

Figure 1B:
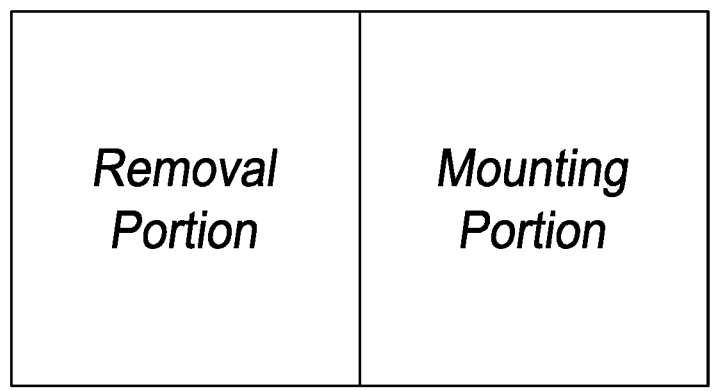
FIG. 1B schematically illustrates a system for modifying an assembly.

As shown schematically in FIG. 1B, in some embodiments a system can be provided for both the removal of an old grip from the rod of a fishing pole as well as the mounting of a new grip onto the rod of a fishing pole. The system can be separated into multiple portions. For example, there can be a removal portion set up to facilitate the removal of the old grip and there can be a mounting portion set up to facilitate the application of a new grip to the rod.

In some embodiments, the removal and mounting portions are configured to be part of a singular unit to facilitate the organization of the portions. In some embodiments, they are separate portions and independently movable.

Figure 2:
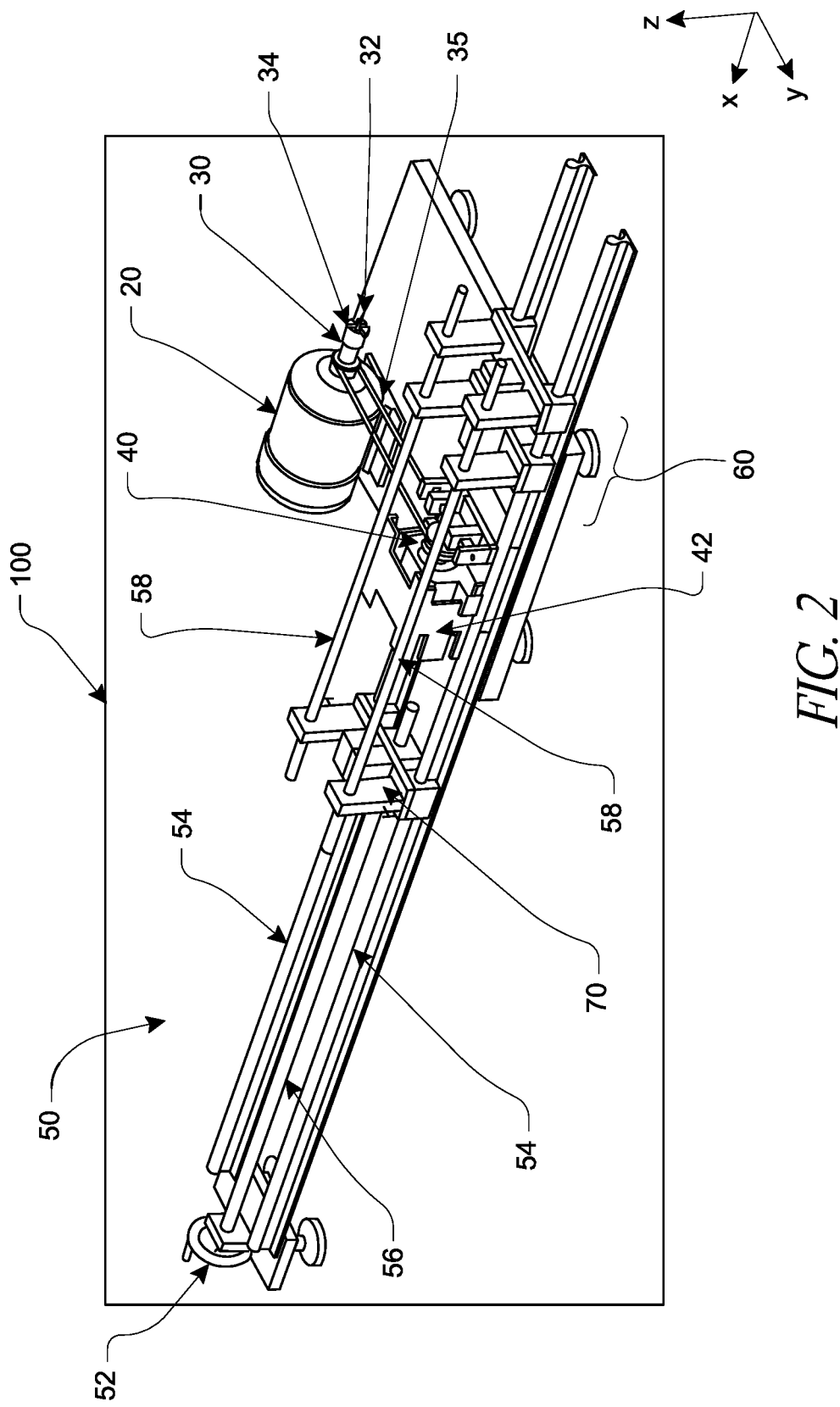
FIG. 2 is a perspective schematic view of an embodiment of a system for modifying an assembly.

FIG. 2 illustrates one embodiment of a grip removal system 100, which may be used to remove a grip from a fishing pole. The grip removal system 100 illustrated in FIG. 2 is shown with a removal portion but no mounting portion, however, in some embodiments, the grip removal system 100 may include a mounting portion. The removal portion includes a drive assembly 20 attached to a first grinding assembly 30. In some embodiments, the drive assembly 20 may be an AC or DC electric motor, or may be powered by gas or another fuel. The drive assembly 20 may be operable connected to a second grinding assembly 40. For example, as shown in FIG. 2 the drive assembly 20 is connected to the second grinding assembly 40 by a drive belt 35. In some embodiments, the grip removal system may include separate drive assemblies for driving each of the first grinding assembly 30 and second grinding assembly 40. In some embodiments, the drive assembly may be connected to the first grinding assembly 30 and the second grinding assembly 40 such that only one grinding assembly may be engaged at a time. The grip removal system 100 further includes a front guidance portion 50 and a rear guidance portion 60 as components of a guidance assembly. In some embodiments, the front guidance portion 50 may include a rod fastening mechanism 70.

In some embodiments, the first grinding assembly 30 includes an inner grinding member 32 and an outer grinding member 34. The inner grinding member 32 may be a drill bit, or other similar member configured to drill out the center of the rear portion of a grip and expose the inner diameter of the shaft. The outer grinding member 34 may be configured to remove the outer grip portion from the outer surface of a fishing rod. Removing the outer grip portion of the fishing pole exposes the outer diameter of the shaft. In some embodiments, it is sufficient to remove the majority of the old grip while leaving a small layer of old grip on the shaft. In some embodiments, the grinding assembly 30 may have replaceable bits which may be used for different size fishing poles. The appropriate bit may be selected from a chart based on the brand and model of the pole, or may be estimated by the user based on the outer dimensions visible on the fishing rod.

The front guidance portion 50 may have a drive mechanism 52. As shown in FIG. 2, the drive mechanism 52 may be a hand crank connected to an advancement screw 56. The advancement screw may be connected to the rod fastening mechanism 70 such that as the hand crank is turned, the rod fastening mechanism 70 advances toward the second grinding assembly 40 such that the grip of a fishing rod held in the fastening mechanism 70 may be engaged with the second grinding assembly 40 to remove the grip. In some embodiments, instead of using a hand crank and screw, the grip removal system 100 may have a drive mechanism configured to automatically advance the shaft of the fishing rod into the second grinding member 40. The drive mechanism may be automatically controlled by one or more controllers. For example, the drive mechanism may advance the handle portion of the fishing rod into the second grinding mechanism at an appropriate pace to safely and efficiently remove the grip from the fishing rod. The appropriate pace may be selected based on the type of grip being removed, the size of the grip being removed, or other factors. In some embodiments, one or more sensors may be used to determine how quickly the grip is being removed and adjust the pace of the drive mechanism.

As shown in FIG. 2, some embodiments of the grip removal system 100 include a set of parallel rails 54 which align various portions of the system. For example, the fastening mechanism 70, the second grinding assembly 40, and the rear guidance portion 60 may each be attached to the rails 56 to maintain proper alignment. The fastening mechanism 70 and the rear guidance portion 60 may be configured to slide along the rails as the handle of a fishing rod is passed through the second grinding assembly 40. This ensures that the fishing rod is aligned with the center of the second grinding assembly as the grip is removed preventing potential damage to the fishing rod.

Also as shown in FIG. 2, some embodiments of the grip removal system 100 include a set of parallel spacing bars 58 configured to maintain the separation between the fastening portion 70 and the rear guidance portion 60. The parallel spacing bars 58 also allow the force of the drive mechanism 52 to move the rear guidance portion 60 with the fastening portion 70. In some embodiments, the distance between the rear guidance portion 60 and the fastening mechanism 70 may be changed by adjusting where the parallel spacing bars 58 are attached to each portion. Maintaining the separation between the fastening portion 70 and the rear guidance portion 60 enables the shaft of the fishing rod to stay centered as it is held by both portions and the handle is advanced into the second grinding assembly 40.

Figure 3:
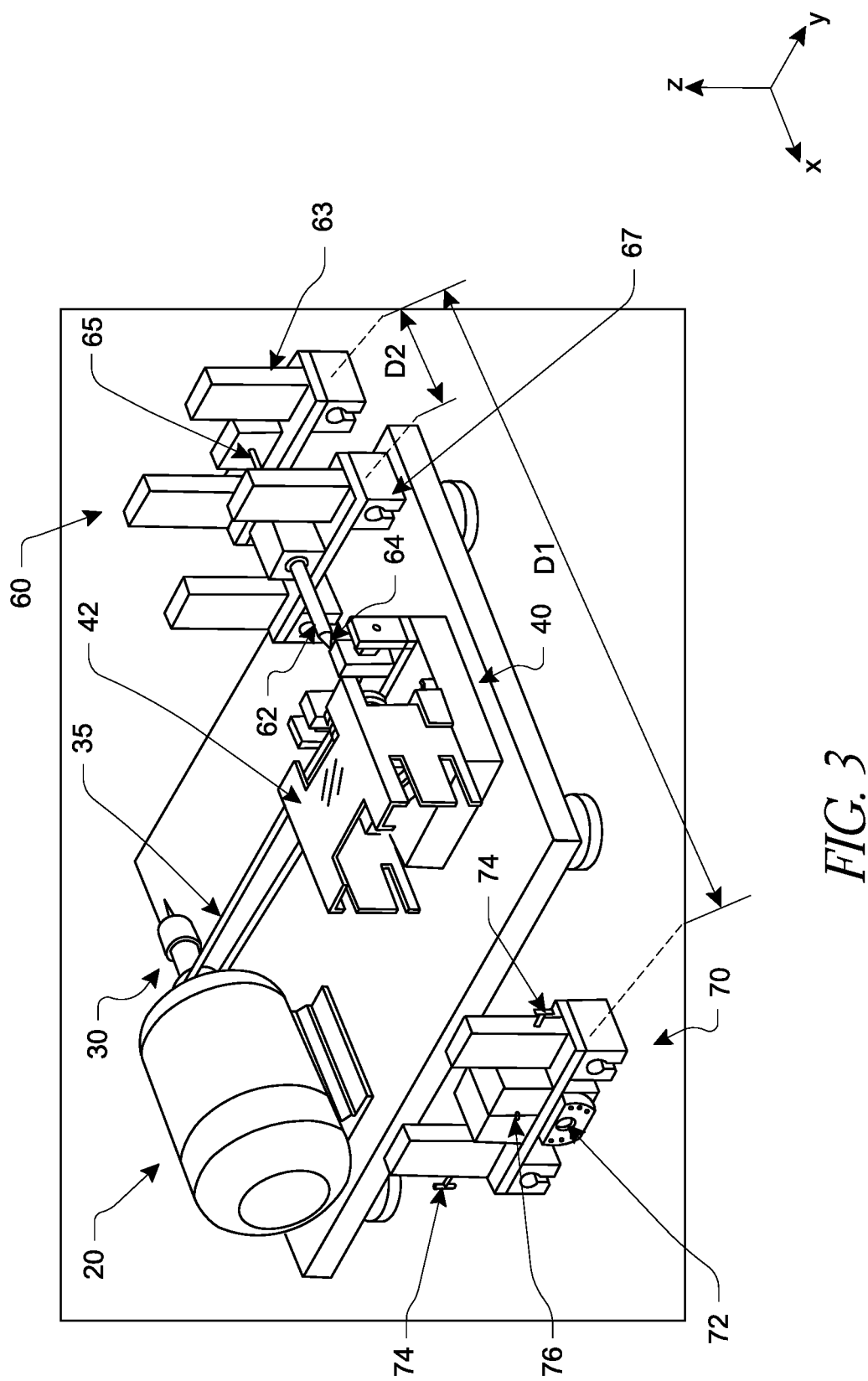
FIG. 3 is a perspective schematic view of components in an embodiment of a system for modifying an assembly.
Figure 5A:
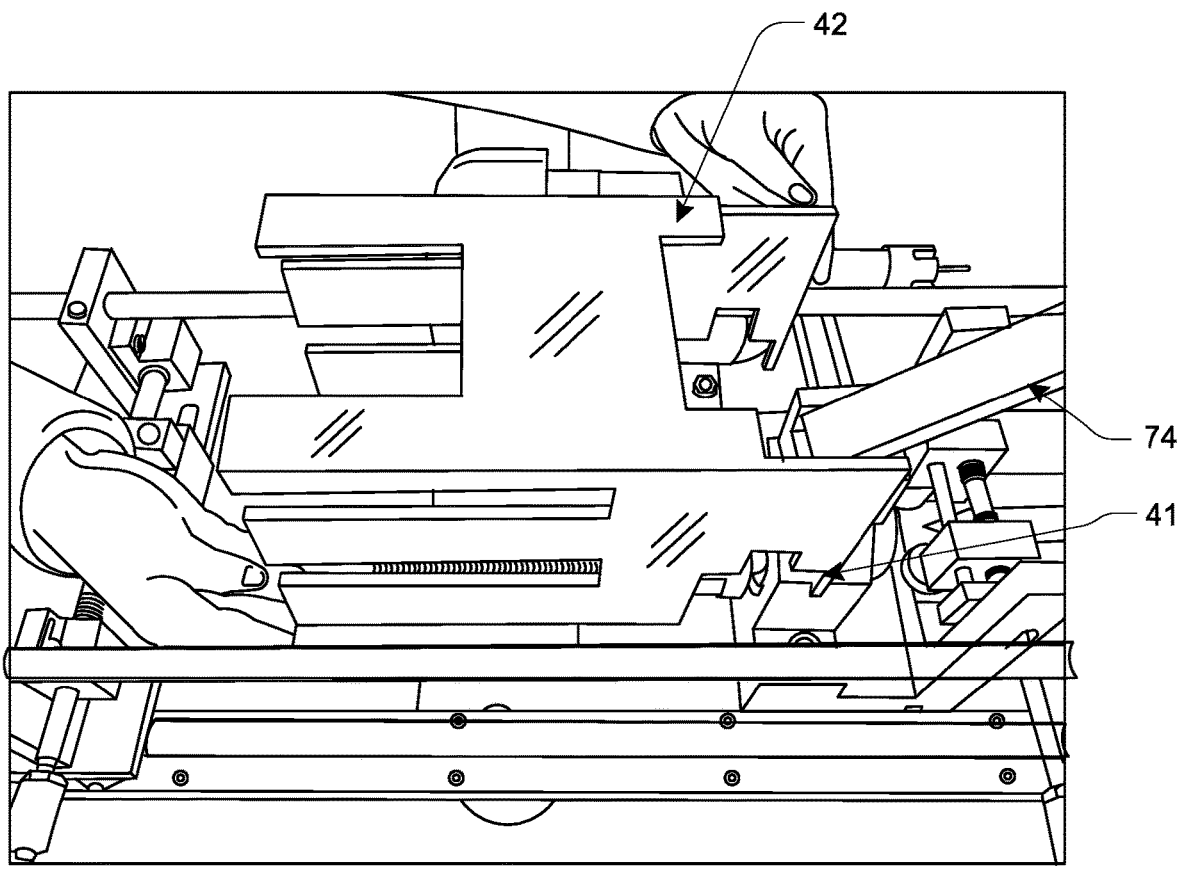
FIG. 5A is an angled view of a portion of an embodiment of a system for modifying an assembly.
Figure 5B:
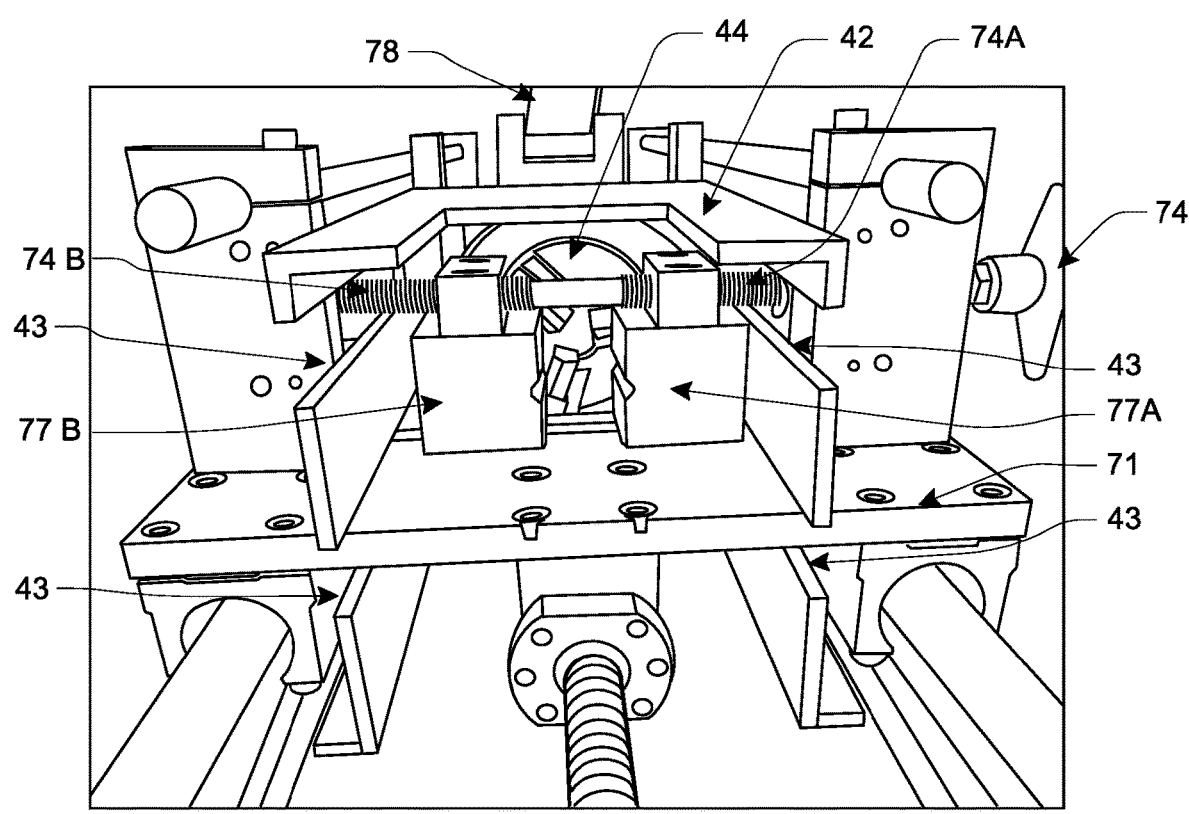
FIG. 5B is an end view of a portion of an embodiment of a system for modifying an assembly.

FIG. 3 illustrates various components of one embodiment of the grip removal system 100 discussed with reference to FIG. 2 above. Some components of the system have been removed from the illustration to expose various elements of the system. As shown in FIG. 3, the fastening mechanism 70 includes a screw hole 72 which couples to the advancement screw 56. As the advancement screw 56 turns, the force against screw hole 72 moves the fastening mechanism along the parallel rails 54. The fastening mechanism 70 also includes a pole clasp 76 which is configured to grip a fishing rod at a position spaced from the butt end of the rod and preferably past the tip end of the old grip or grips. The pole clasp 76 is secured around a pole using tightening screws 74. As shown in FIG. 3, the fastening mechanism 70 may include two tightening screws 74 to fasten a fishing rod in place. In some embodiments, the fastening mechanism 70 includes a single tightening screw 74 to secure pole clasp 76 around a fishing pole. For example, the embodiment as shown in FIGS. 5A and 5B includes a single tightening screw 74. The use of a single tightening screw 74 may ensure that the pole remains centered with the grinding member without having to move both sides of the pole clasp 76. For example, a single tightening screw may move both sides of pole clasp 76 such that at any separation, the center between the sides is aligned with the second grinding assembly 40.

Also as shown in FIG. 3, the rear guidance portion includes a centering rod or post 62. A portion of the centering post may be placed inside the exposed handle of a fishing rod to guide the rear end of the rod through the grinding member. The centering post 62 may have a conical end 64 such that a pole placed on the centering rod automatically sits securely on the centering rod 62, in a centered position along the tapered surface of the conical end 64. In some embodiments the rear portion of the fishing rod may be held in alignment with the second grinding assembly 40 with a vice, grip, clamp, fastener, tightening screws, clasp, snap, or other devices capable of securing the rear portion of the fishing rod in alignment with the grinding assembly. When fixed between centering rod 62 and clasp 76, the central axis of the handle portion of the rod is preferably aligned with the central axis of the grinding assembly.

As shown in FIG. 3, in some embodiments, the rear guidance portion 60 may include a spacing assembly 63 having a spacing screw 65, and a centering assembly 67 having the centering rod 62. The spacing assembly 63 may be adjusted to vary the distances D1 and D2 to accommodate fishing rods having handle portions of various sizes. For example, the distance D1 may be changed by adjusting the connection of parallel spacing bars 58 to the fastening mechanism 70 and the spacing assembly 63. The adjustment made to the distance D1 changes the length of the handle portion of a rod that may be modified by the system. However, for the system to operate properly, the centering post 62 should be securely engaged with a fishing rod. Thus, in some embodiments, the system also provides the ability to make fine adjustments to distance D2. For example, the distance D2 may be adjusted using spacing screw 65. When spacing screw 65 is screwed one direction, the distance D2 is increased, and when it is screwed the other direction, the distance D2 is decreased. Using the fine adjustments provided by varying the distance D2, the centering rod 62 can be securely inserted in to the shaft of a fishing pole to align it for grip removal. In some embodiments, the grip removal system only allows adjustment of one of the distances D1 and D2. For example, the centering post 62 may be secured directly to spacing assembly 63 such that the only adjustment may be to distance D2. In some embodiments, the parallel rails 54 may include marks indicating the distances D1 and D2. This may enable a user to remember which distances work best for different fishing rods. In addition, the system may include a table indicating preferred distances for a variety of fishing rods.

In some embodiments, the spacing between the centering rod 62 and the fastening mechanism 70 may preferably be set such that the centering rod holds the end portion of the shaft of a fishing pole, and the fastening mechanism holds the shaft of the fishing rod between the distal or tip end of the grip portion of the rod and the first eyelet of the fishing rod. In some embodiments, or based on user preference, the fastening mechanism may hold the fishing rod further down the rod, for example, further than the first eyelet of the fishing rod. Depending on the amount of grip to be removed from the fishing rod, the fastening mechanism may also hold the fishing rod on the grip portion of the shaft. For example, if only a butt or rear grip is to be removed from the fishing rod, the fastening mechanism may grip a fore grip or real seat of the fishing rod. In each of these situations, the distances D1 and D2 can be adjusted as discussed above. Once fixed, the system permits longitudinal movement of the rod, the tightening mechanism 70, and the rear guidance portion 60 along the central axis of the grinding assembly 40

Figure 4:
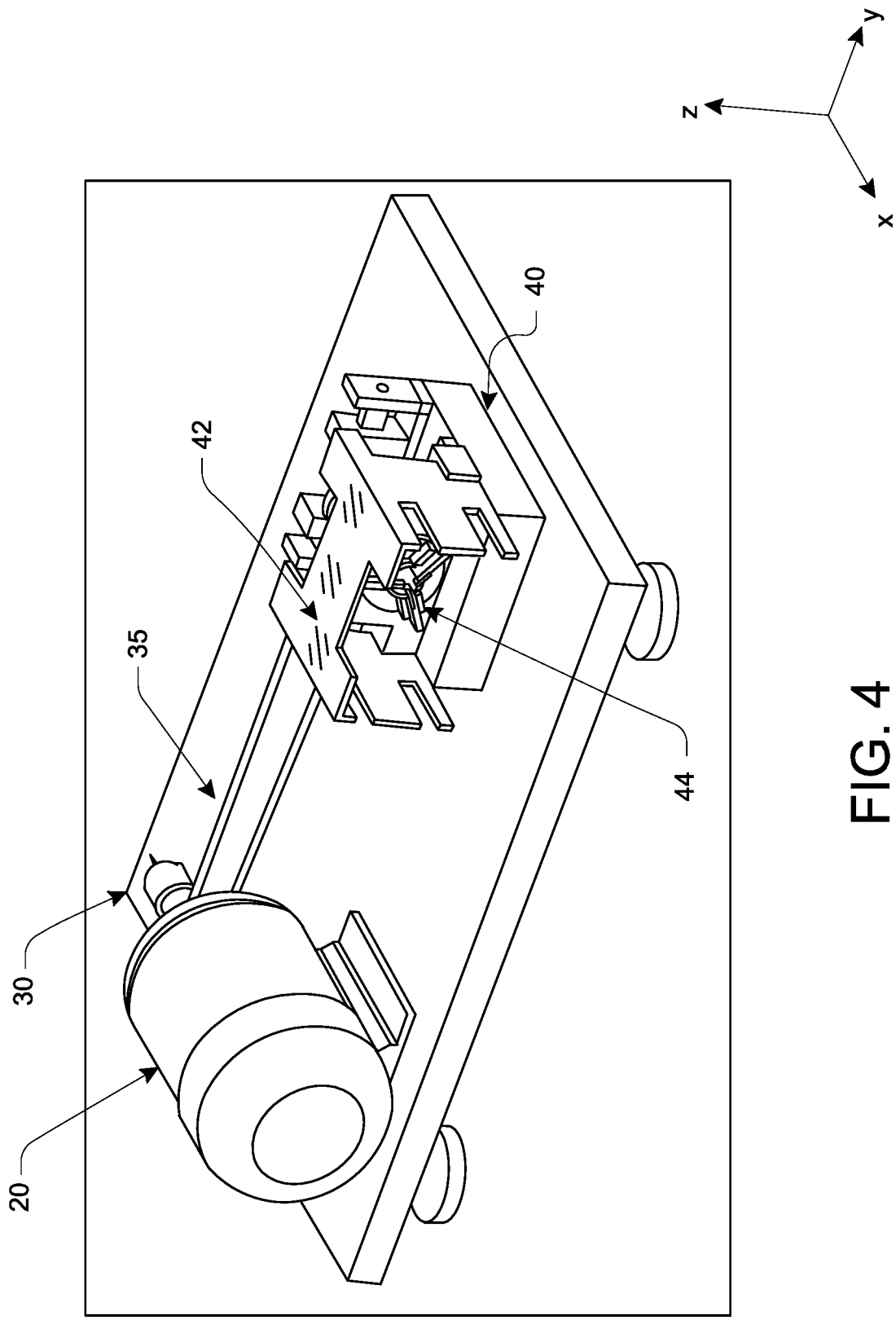
FIG. 4 is a perspective schematic view of components in an embodiment of a system for modifying an assembly.

FIG. 4 illustrates additional details of an embodiment the second grinding assembly 40 as used in one embodiment of the grip removal system 100. As shown in FIG. 4, the second grinding assembly includes a shield 42 and a grinding member 44. The grinding member 44 is driven by the drive assembly 20 through drive belt 35. The shield protects a user from particles of a grip removed by the grinding member 44. The shield may preferable extend past the grinding member 44 such that particles of grip removed from the shaft of the fishing rod are not thrown at a user. The shield may also protect a user from accidentally coming into contact with the grinding member 44.

FIGS. 5A and 5B illustrate components of one embodiment of the grip removal system 100. As shown in FIG. 5A, in some embodiments, the shield 42 may be removable. This enables an operator quick access to grinding member 44 so that the dimensions of the grinding member may be adjusted, or a different grinding member may be attached. The shield may preferably extend past the grinding member 44 to prevent debris removed from a fishing rod from flying away from the grip removal system 100. The shield may include a locking notch 41 configured to secure the shield to the grinding member 44. The locking notch 41 can be constructed to fit securely over or into a portion of the grip removal system 100 to hold the shield in place over the grinding member to catch debris. In some embodiments, the shield may include a clamp, fastener, tightening screw, or other mechanism to further secure the shield to the grinding member 44. The shield 42 may also be attached to the grip removal system 100 by a hinge, which enables the shield to be pulled back to expose the grinding member 44 for adjustment. As shown in FIG. 5A, the shield may be made from a transparent material such that an operator may be protected from debris while still viewing the operation of the grinding mechanism. In some embodiments, the shield may preferably be constructed from a plastic polymer such as Poly(methyl methacrylate) or a polycarbonate.

In some embodiments, as shown in FIG. 5B, the shield 42 may include one or more channels 43 to allow components of the grip removal system 100 to pass under the shield toward the grinding member 44. FIG. 5B shows the fastening mechanism 70 advanced under the shield 42. The channels 43 allow the platform 71 and tightening screw 74 of the fastening mechanism 70 to travel past the extended portion of the shield. This enables the grip removal system 100 to advance a fishing rod further toward the grinding member 44 and therefore remove grip further up the shaft of the fishing rod. In some other embodiments, the shield 42 may not have channels 43, and the rod would only be advanced until components of the system reached the outer extended edge of the shield 42. As shown in FIG. 5B, the shield 42 may be designed to fully surround the grinding member 44, while protecting both the operator, and other various components of the system. For example, the shield 42 may be configured to prevent debris from landing on moving components of the system, such as parallel rails 54, drive assembly 20, belt 35, or other components that may be affected by the presence of debris from grinding. Some embodiments of the grip removal system 100 may include a larger or smaller shield. For example, a smaller shield may be configured to encompass only an area immediately surrounding the grinding mechanism, while a larger shield may surround more components of the system. For example, the entire advancement portion of the system may be surrounded by a shield.

As discussed with reference to FIG. 3 above, the embodiment in FIG. 5B includes a single tightening screw 74 to fasten the vice around a fishing rod. As shown in FIG. 5B, the tightening screw includes two counter rotating screw portions, 74A and 74B. The screw portion are constructed such that turning the tightening screw 74 one direction moves clamp portions 77A and 77B outward from center alignment of the grinding member, and turning the tightening screw 74 in the other direction moves claim portions 77A and 77B toward center alignment with the grinding member. The threading on the screws are constructed to move the clamp portions the same amount per turn of the tightening screw 74 such that a fastened fishing pole will be in alignment with the grinding member.

As shown in FIG. 5B, in some embodiments the system includes a stabilizer 78. The stabilizer 78 acts as an additional guide for securing the fishing pole as it is advanced through the grinding assembly 44. For example, the stabilizer may be an arm which rotates on a hinge to hold a portion of the fishing pole steady. In some embodiments, other types of stabilizers may be used.

FIG. 6 illustrates the grinding member 44 as used in one embodiment of the grip removal system 100. The grinding member 44 includes a drive portion 46 and a grinding portion 48. The grinding member 44 may be positioned inside of a grinding member receiver 47. The grinding member receiver is configured to hold the grinding member 44 in alignment with the other portions of the grip removal system 100 while allowing the grinding member to rotate freely when driven by the drive assembly 20 through drive belt 35. Drive belt 35 passes through a notch 45 in the drive portion 46 and turns the grinding member 44. In some embodiments the grinding portion 48 includes several blades configured to grind or scrape some or all of the grip off of a handle. The blades may be adjustable such that grips may be removed from fishing rods with shafts having various circumferences. In some embodiments the grinding portion 48 may include various attachments with different dimensions to accommodate fishing rods of different sizes. An embodiment of a grinding portion 48 is described further below with reference to FIG. 7.

Figure 7:
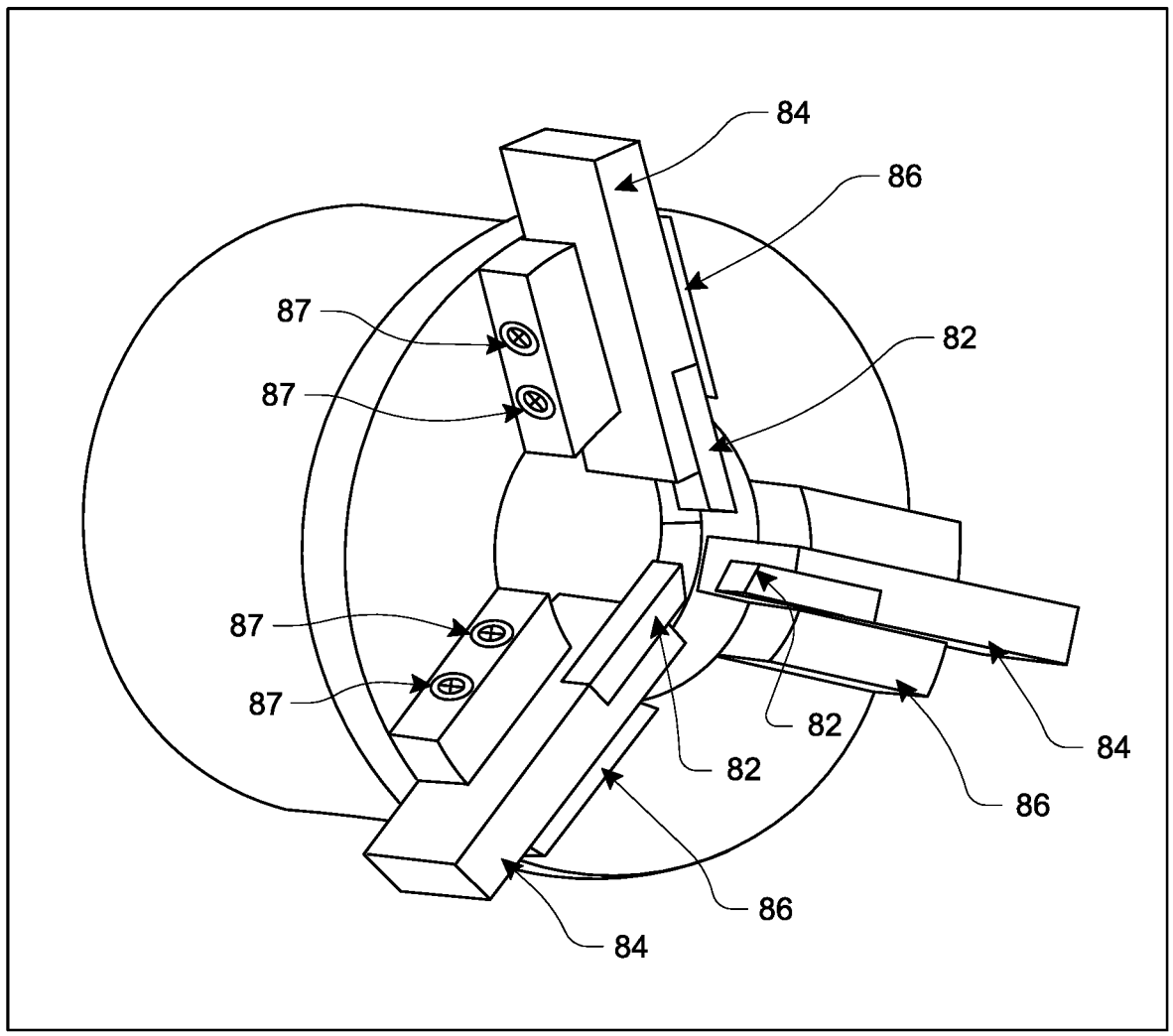
FIG. 7 is a perspective view of components in an embodiment of a system for modifying an assembly.

FIG. 7 illustrates an embodiment of a grinding portion 48 as used in one embodiment of the grip removal system 100. The grinding portion 48 includes one or more grinding blades 82 each held in place by a blade positioner 84. The blade positioners 84 may be secured with securing devices 86. When a handle is placed in line with the grinding portion 48, the blade positioners 84 may be adjusted such that the grinding blades 82 are in contact with the shaft of the fishing pole. When the grinding member 44 is rotated, the grinding blade will scrape against the outside of the shaft removing the grip from the fishing rod. In some embodiments the securing devices 86 include one or more setting screws 87 which are tightened through the securing devices 86 against the blade positioners 84 when the grinding blades 82 are in a desirable position against or near the outer dimensions of the fishing rod. In some embodiments, the grinding blades may be automatically positioned against the outer dimension of the fishing rod. For example, the blades may be automatically tightened against a fishing rod with a set amount of force, wherein the force is selected such that it will not damage the fishing rod, but will bring the blades sufficiently close to the outer surface of the fishing rod to remove the desired amount of grip during the grinding process. In some embodiments fewer or additional grinding blades may be used as part of a grinding portion 48. For example, 2 blades, 4 blades, 5 blades, or other numbers of blades may be used for grinding.

As shown, an embodiment of a system for removing the grip from a fishing pole may include a first grinding member, a second grinding member, a guidance assembly, and an advancement mechanism. The first grinding member may include an inner grinding portion having an outer diameter smaller than the inner diameter of a shaft of a fishing pole. The first grinding member may also include an outer grinding portion having an inner diameter larger than an outer diameter of the shaft of the fishing pole. The inner grinding portion and the outer grinding portion may be coupled together to rotate about a common axis. The second grinding member may have an inner diameter larger than the outer diameter of the shaft of the fishing pole. The guidance assembly may include a first mounting portion aligned with a rear facing portion of the second grinding member and a second mounting portion aligned with a forward facing portion of the second grinding member. For example, the first mounting portion and second mounting portion may be aligned with a rotational axis of the second grinding member. In some embodiments, the second mounting portion is spaced apart from the first mounting portion at least a distance from an end portion of the fishing pole past a grip portion of the fishing pole. In some embodiments, the distance the second mounting portion is spaced from the first mounting portion is adjustable. The advancement mechanism may be coupled to the guidance assembly to enable longitudinal movement of the first mounting portion and the second mounting portion in alignment with the second grinding assembly.

As shown, some embodiments may also include a drive assembly operably coupled to the first grinding member and the second grinding member, wherein engaging the drive assembly enables rotation of the first grinding member and the second grinding member. In some embodiments, the drive assembly may be independently engaged to rotate only one of the first grinding member or the second grinding member at a time, or to idle without rotating either grinding member.

In some embodiments, as shown, the first mounting portion comprises a centering rod having at least a portion with an outer diameter smaller than the inner diameter of the shaft of the fishing pole.

In some embodiments, the outer diameter of the inner grinding portion of the first grinding member is adjustable to accommodate fishing poles of various dimensions. The inner diameter of the outer grinding portion of the first grinding member may also be adjustable to accommodate fishing poles of various dimensions. In some embodiments, the second grinding member comprises one or more cutting blades disposed radially about an axis of rotation. In some embodiments, the displacement of the one or more cutting blades from the axis of rotation is adjustable to accommodate fishing poles of various dimensions.

As another example, a system for removing the grip from a fishing pole may include a grinding assembly, a guidance assembly, and an advancement mechanism. The grinding assembly may have a grinding member having an inner diameter larger than the outer diameter of the shaft of a fishing pole. The guidance assembly may include a first mounting portion aligned with a rear facing portion of the grinding member and a second mounting portion aligned with a forward facing portion of the grinding member. In some embodiments the space between the first mounting portion and the second mounting portion is adjustably fixed to accommodate fishing poles having grip portions of various lengths. The advancement mechanism may be coupled to the guidance assembly enabling longitudinal movement of the guidance assembly in alignment with the second grinding assembly.

In some embodiments, the first mounting portion and the second mounting portion are positioned on one or more rails enabling the first and second mounting portions to slide in longitudinal alignment with the grinding member. One or both of the first mounting portion and the second mounting portion may also be adjustably fixed to a spacing bar to enable adjustment of the space between the first mounting portion and the second mounting portion. For example, the connection point between of one or both of the mounting portions to the spacing bar may be adjusted to change the distance between the first and second mounting portions. Thus, in some embodiments, the second mounting portion is spaced apart from the first mounting portion a distance greater than the distance from the end portion of the fishing pole to the distal end of a grip portion of the fishing pole. The second mounting portion may also be spaced apart from the first mounting portion a distance less than the distance from the end portion of the fishing pole to the first eyelet of the fishing pole.

Figure 8:
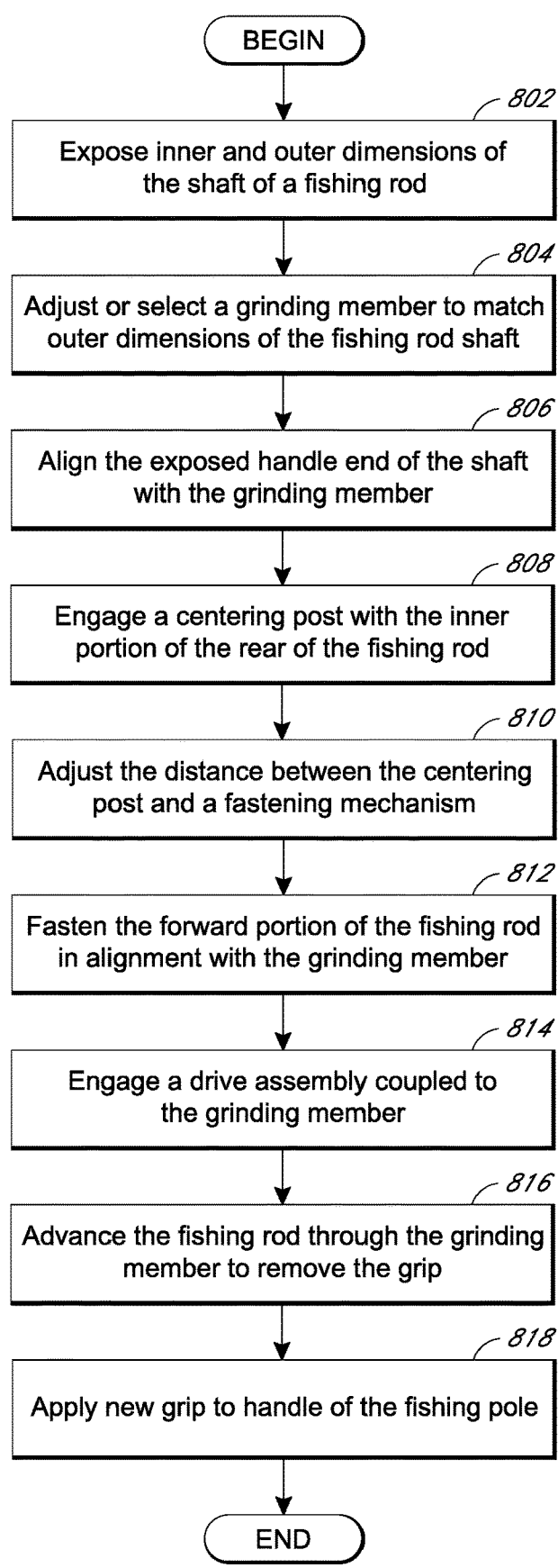
FIG. 8 is a flow chart illustrating an exemplary method according to an embodiment.

The grip removal system 100 as described with reference to FIGS. 2-7 may be used to remove a grip from a fishing pole or similar object. FIG. 8 is an example block diagram illustrating some processes which may be used in removal of a grip from a fishing rod. Beginning in block 802, in one embodiment of a method to remove a grip, the first step is exposing the inner and outer dimensions of the handle end of the shaft of a fishing rod. For example, end of the shaft of the fishing rod may be exposed using the first grinding assembly 30. The handle end of a fishing pole may be guided onto the inner grinding member 32 which drills out and removes at least a portion of the grip from the center of the shaft of the fishing rod. As the grip is removed from the center of the fishing pole, the outer grinding member 34 may remove a portion of the grip from the exterior of the fishing pole. The first grinding assembly 30 may only grind away a small first portion from the handle end of the fishing rod.

Moving on to block 804, a user may adjust a grinding member to match the outer dimensions of the shaft. For example, as shown in FIG. 7, the grinding blades 82 may be adjusted to accommodate the shaft of the fishing rods. In some embodiments the adjustment is manually performed, but the process may also be automated. Instead of adjusting the grinding member, in some embodiments, a grinding member is selected with dimensions appropriate for a particular fishing rod.

In block 806, the exposed handle end of the fishing pole is aligned and placed within a grinding member. For example, the handle end of the fishing pole may be placed inside second grinding assembly 40 as shown in reference to FIGS. 2-7. In block 808, the open end of the shaft can be slid onto a portion of a centering post to align the fishing rod with the grinding member. For example the fishing rod may be placed onto the centering post 62. In block 810, the distance between the centering post and a fastening mechanism is adjusted to accommodate the fishing pole. For example, the distance between the two points must be long enough such that the entire grip portion of the pole fits. On the other hand, the distance must be small enough such that the fishing pole is secured at two points in a sturdy section of the fishing pole. If the forward portion of the pole is fastened at a point that is too flexible, the pole may not be accurately guided through the grinding member in alignment. The distance may be adjusted as discussed above with reference to FIG. 3, or according to another process.

In block 812, the forward portion of a fishing rod is fastened in alignment with the guiding member. Thus, the fishing pole is secured at both ends such that it will remain in alignment with the grinding member. In some embodiments, the fishing pole may be secured in a fastening mechanism before being placed over a centering post. In addition, the distance between the fastening mechanism and the centering post may be adjusted before or after securing the fishing pole in blocks 808 and 812.

In block 814, a drive assembly is engaged to activate the grinding member. For example, an electric motor may be engaged to rotate the grinding member about a center axis, wherein the fishing pole is aligned with the center axis by the fastening mechanism and the centering post. In block 816, the fishing pole is advanced through the grinding member such that the grinding member removes the grip from the fishing pole. For example the fishing pole may be advanced through the drive mechanism using a drive mechanism 52 as discussed with reference to FIG. 2 above. In block 816 a new grip may be applied to the handle portion of the fishing pole.

Other methods of modifying fishing pole grips may include fewer, additional, or modified processes than those described in reference to FIG. 8. For example, in some other embodiments, the process may begin with removing an end portion of a mounted fishing pole grip from a fishing pole to expose an end portion of the shaft of the fishing pole. The inner diameter of a grinding member may then be adjusted to correspond to an outer diameter of the end portion of the shaft of the fishing pole. For example, the inner diameter of the grinding member, such as the position of grinding blades, may be set such that the grinding member is adjacent to or almost adjacent to the outer edge of the shaft of the fishing pole.

In some methods, the fishing pole may then be aligned with the grinding member. For example the central axis of the fishing pole may be aligned with the central axis about which the grinding member rotates. A rotational assembly may then be powered to rotate the grinding member about its axis. The mounted fishing pole grip may then be engaged with the grinding member. For example, such that grinding blades rotate about the outer dimension of the shaft of the fishing pole to scrape or grind away the mounted fishing pole grip. The shaft of the fishing pole may then be advanced through the grinding member such that the grinding member substantially removes the mounted fishing pole grip as the shaft passes through the grinding member.

In some embodiments of methods for modifying a fishing pole grip from a fishing pole, a replacement grip is installed on the handle portion of the shaft of the fishing pole. For example, in some embodiments, double sided tape is wrapped around the handle portion of the fishing pole after the mounted fishing pole grip has been substantially removed. Then lubricant may be applied to the double sided tape that has been wrapped around the handle portion of the fishing pole. The replacement fishing pole grip can then be slid onto the handle portion of the shaft of the fishing pole, on top of the double sided tape. When the lubricant dries or evaporates, the double sided tape will bind the replacement grip to the handle portion of the fishing pole.

In some methods of modifying or changing a fishing pole grip, the double sided tape may be wrapped around a residual portion of a mounted fishing pole grip that has been substantially removed. For example, in some methods, the shaft of a fishing pole grip may have a tapered portion such that the butt end of the shaft of the fishing pole is wider than at least some portions of the handle portion of this shaft of the fishing pole. In some methods of removing the fishing pole grip, a residual portion of the mounted fishing pole grip is left on such a tapered portion of the shaft of the fishing pole. In such methods, the residual portion of the mounted fishing pole grip may form a substantially cylindrical surface, which may be used as the mounting surface for a replacement grip. In some other embodiments a residual portion of the mounted fishing pole grip may be removed from the shaft of the fishing pole after the main portion of the fishing pole grip has been substantially removed.

In some embodiments of methods for changing or modifying a fishing pole grip, aligning the shaft of the fishing pole with a grinding member includes mounting an exposed end portion of the shaft of the fishing pole on a centering post which is in alignment with the grinding member. A front portion of the shaft of the fishing pole may be fastened into a fastening mechanism aligned with the grinding member. The front portion of the shaft may be further from the end portion of the shaft than the mounted fishing pole grip. In some methods, the distance between a centering post and a fastening mechanism may be adjusted to accommodate fishing poles with grip portions of various lengths or dimensions.

In some methods, the inner diameter of a grinding member may be adjusted by tightening one or more grinding blades to be substantially adjacent to the outer diameter of the end portion of the shaft of the fishing pole.

FIG. 9 illustrates a second embodiment of a grip removal system 200. As shown in FIG. 9, some embodiments provide a grip removal system having a removal portion 210 and a mounting portion 260. The removal portion includes a rotational assembly including a grinding assembly 220 coupled to a drive assembly 230. The grinding assembly 220 includes a grinding member 222, as shown a drill bit 224, mounted thereto and configured to rotate. The grinding assembly is preferably disposed under a shield 280 that can catch debris while permitting the user to view the grinding member as it engages a fishing pole grip. The drive assembly 230 may be turned on or off with a switch 232. As shown in FIG. 9, some embodiments of the grip removal system 200 may be portable. For portable models, non-slip feet 270 may be provided to prevent the grip removal system 200 from sliding of moving while in operation. In some other embodiments the grip removal system 200 may be mounted permanently to a structure, or may clamp onto a structure for secure operation.

In some embodiments, the mounting portion includes a rod mount assembly 262 and a catch basin 264. The rod mount assembly 262 is configured to engage rods of various outer dimensions to securely hold the handle portion of the rod over the catch basin. The catch basin is configured to catch adhesive, lubricant, or other materials dripping from the handle of a fishing rod.

Figure 10A:
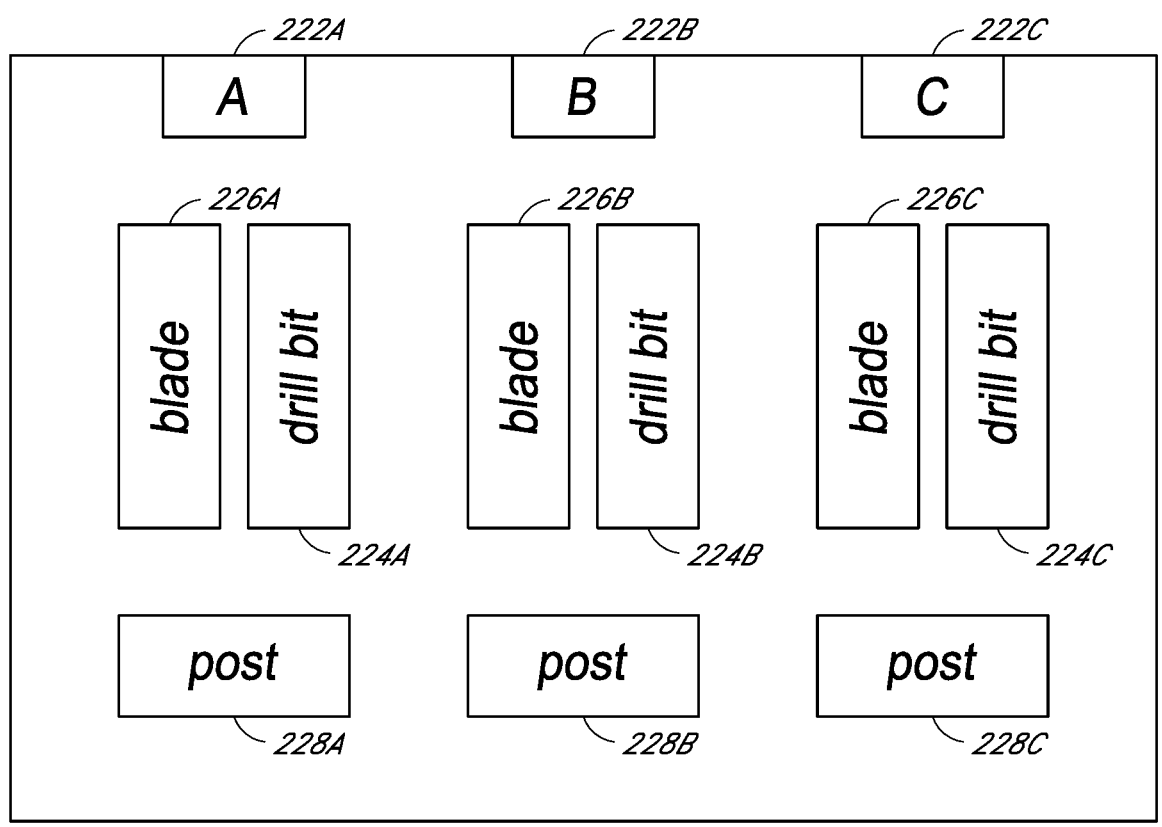
FIG. 10A is a schematic view of components in an embodiment of a system for modifying an assembly.

In some embodiments, the system is configured to remove an old grip from the rod of a fishing pole to allow a new grip to be applied to the rod in its place. The handle portion of the rod typically defines an outer diameter and a hole at its butt end that defines an internal diameter. There are many brands and many models of fishing poles. The rods of the various poles can vary from brand to brand and from model to model. FIG. 10A schematically shows a multitude of grinding members 222. In some embodiments, grinding members are provided in groups. A particular drill bit is provided that is dimensioned to correspond to a particular internal diameter for a rod. Blades are provided that are similarly dimensioned to correspond to the outer dimensions of a rod. Centering posts 228 are provided that correspond to the inner dimensions of a rod. As shown in FIG. 10A, the grinding members 222 can be provided in an organizational assembly that facilitates locating the corresponding grinding members 222 that are necessary to remove a grip from a particular rod.

FIG. 10B schematically shows an exemplary guide that is configured to help a user identify which grinding members are suitable for use with which fishing poles. The guide can be set up to identify particular brands and models and link them to particular groupings of grinding members 222 as shown. In some cases, a blade or post or bit from one category may be used with the blade, post, or bit from one or more other categories to appropriately match a particular rod. For example, the blade 226A from grinding member A as shown in FIG. 10A may be paired with the drill bit 224B from grinding member B. In some embodiments the appropriate grinding member 222 may be selected by comparing the blades and drill bits to the inner and outer dimensions of the shaft of the fishing rod.

Figure 11:
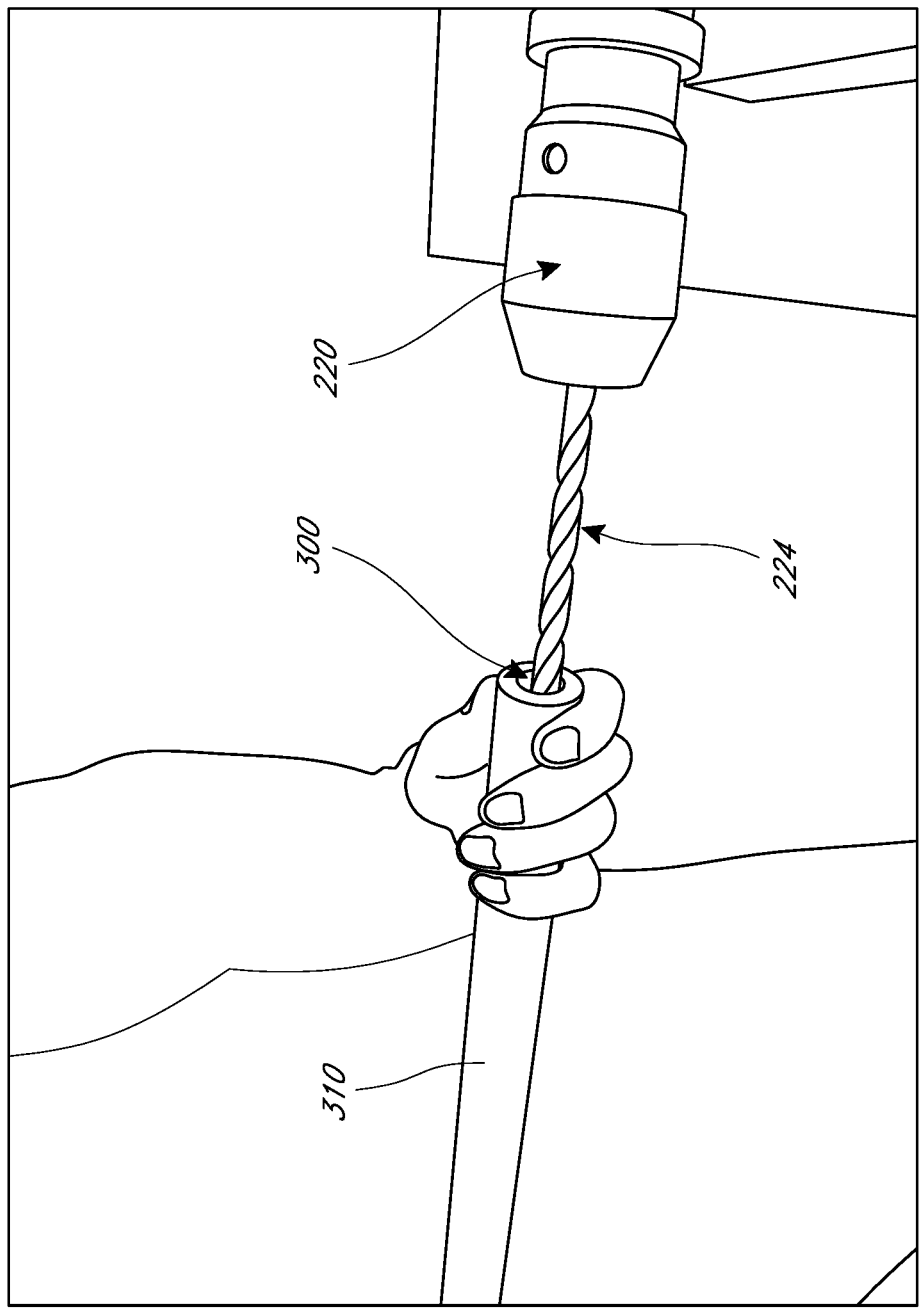
FIG. 11 is a perspective view of components in an embodiment of a system for modifying an assembly and a step in a method for modifying an assembly.

FIG. 11 shows a grinding member, in this case a drill bit 224, being used to grind a hole into the butt end of a cork grip 310 on a fishing pole 300. The drill bit has been selected so as to remove the cork and enter the hollow butt end of the rod, but avoid removing a significant portion of the rod when it enters the hole at the butt end. The drill bit 224 can be attached to the grinding assembly 220 with a standard drill bit attachment mechanism. Though shown being manually fed onto the grinding member 222, in some embodiments, a mechanical hold may be used to hold and feed the grip onto the grinding member to ensure the drill bit only removes old grip. In some embodiments, a drill bit is selected that has a significantly smaller outer diameter than the inner diameter of the particular rod. As such, the risk of damaging the rod is minimized. Once an initial hole is drilled, a user can manually remove the remaining cork with an awl, blade, or other tool so that the rod defines the smallest internal diameter at the butt end of the old grip.

Figure 12A:
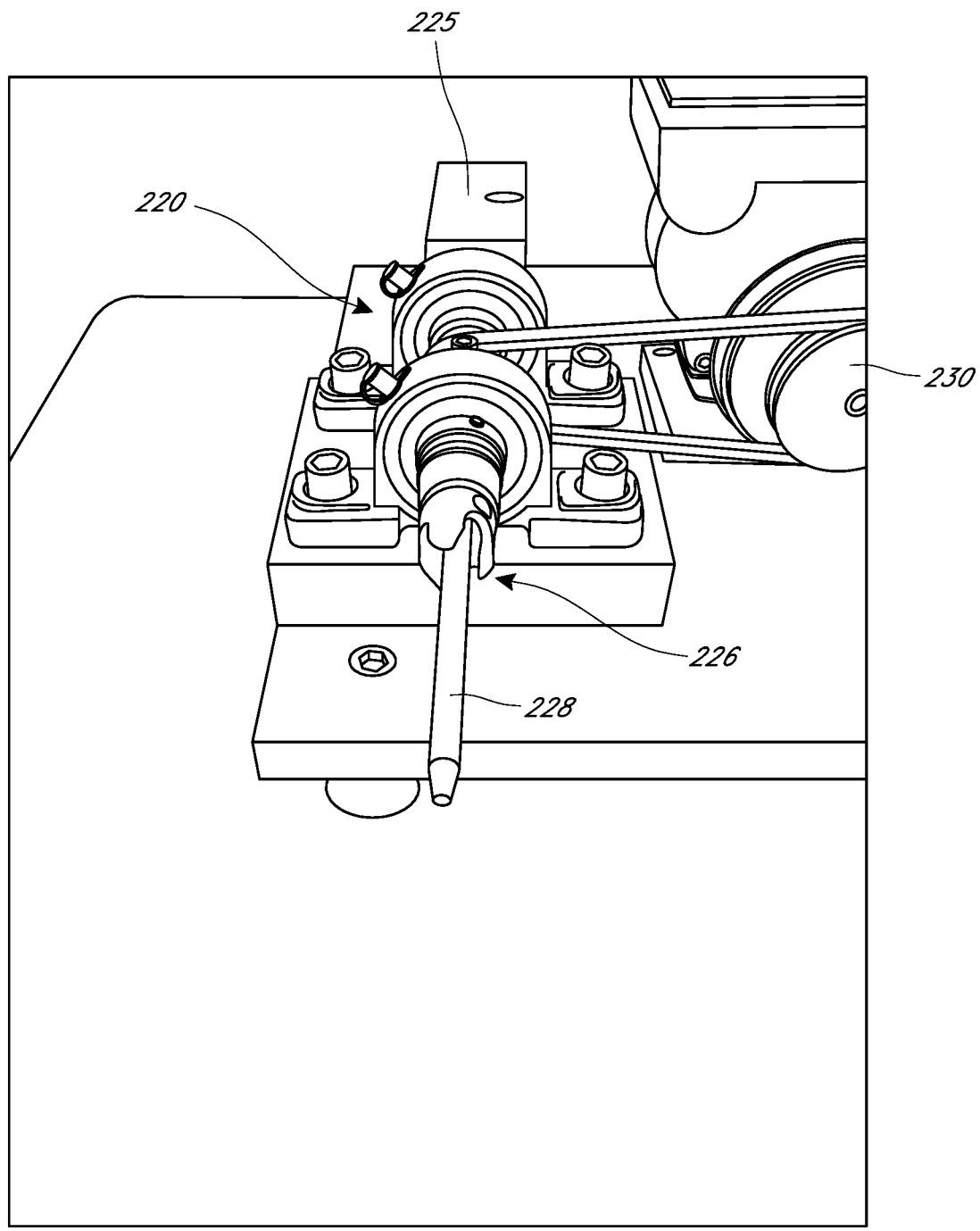
FIG. 12A is a perspective view of components in an embodiment of a system for modifying an assembly including a centering post and a grinding blade.

FIG. 12A shows a different grinding member attached to the grinding assembly 220. This grinding member includes a centering post 228 and one or more blades 226 positioned radially outward from the centering post. The centering post 228 is dimensioned to fit within the rod of the fishing pole. In some embodiments, the fit is close without being snug to ensure proper alignment of the one or more blades along the outer surface of the rod. In some embodiments, a portion of a tapered end of the centering post 228 fits into the open end of the rod shaft. The blades 226 are spaced from the centering post such that as the rod is fed along the post, the blades remove the grip, for example cork, from the rod while maintaining the integrity of the rod. The centering post 228 extends through the grinding assembly 220 and is held by the mounting bracket on the opposing side of the grinding assembly. In some embodiments, the centering post is removably attached to the mounting bracket. For example, the centering post 228 may be removably attached to allow for exchanging the centering post for a second post of different size to allow the system to accommodate a variety of sizes of fishing poles.

According to some embodiments, the centering post 228 and blade 226 are separate components that are selected for a particular rod application. Accordingly, a particular centering post may be used with different blades depending on the thickness of the rod wall. Once a rod is identified, an appropriate centering post and blade combination is selected. The centering post can be secured to the mounting bracket 225 such that it extends through the grinding assembly 220. The blade 226 can be attached to grinding assembly such that it will rotate about a generally stationary horizontal axis when driven by the drive assembly. The centering post 228 may translate back through the blades 226 as the rod is fed through the grinding assembly 220. Alternatively, the rod may slide over an appropriately sized post.

Figure 12B:
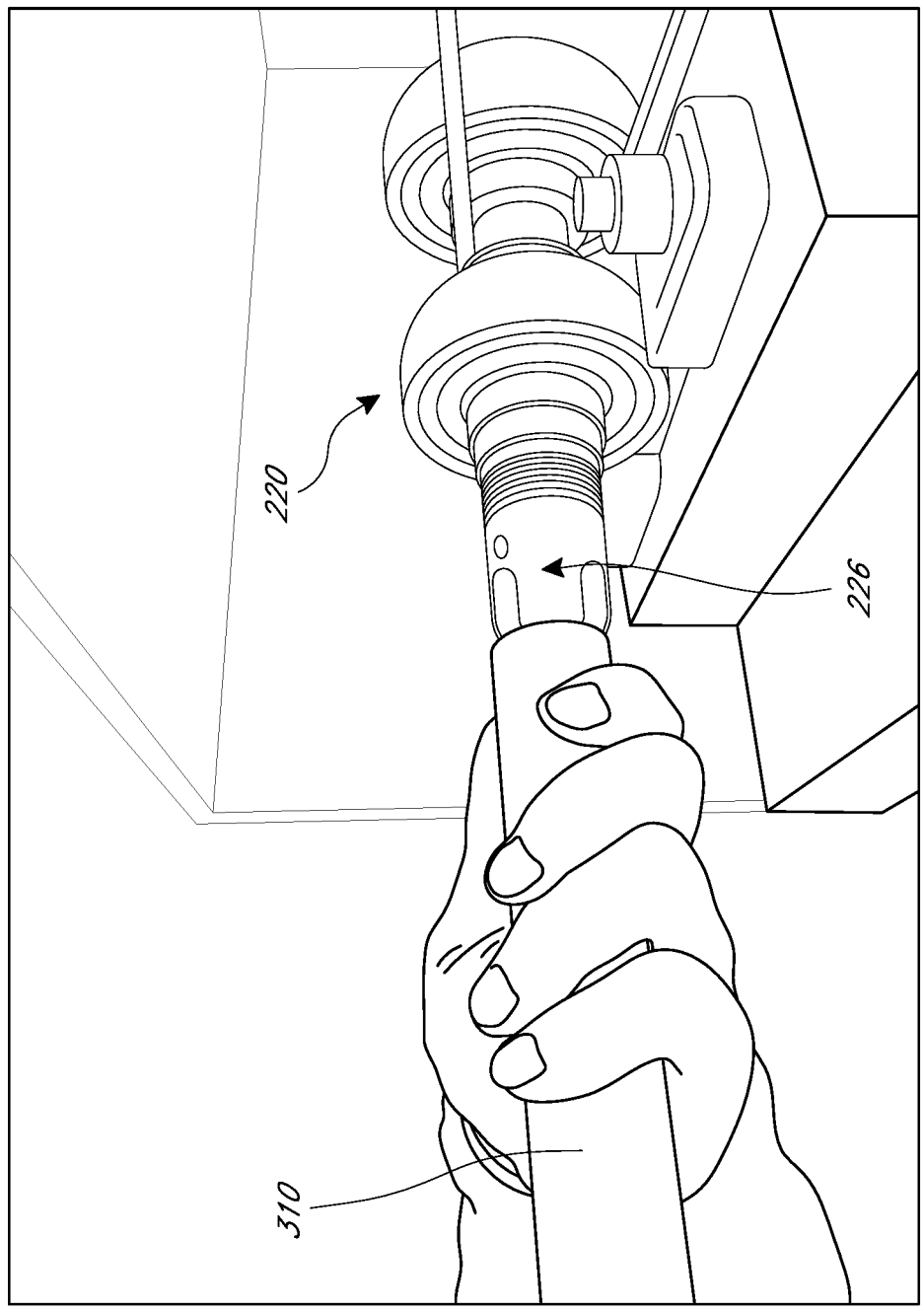
FIG. 12B is a perspective view of components in an embodiment of a system for modifying an assembly and a step in a method for modifying an assembly.
Figure 13:
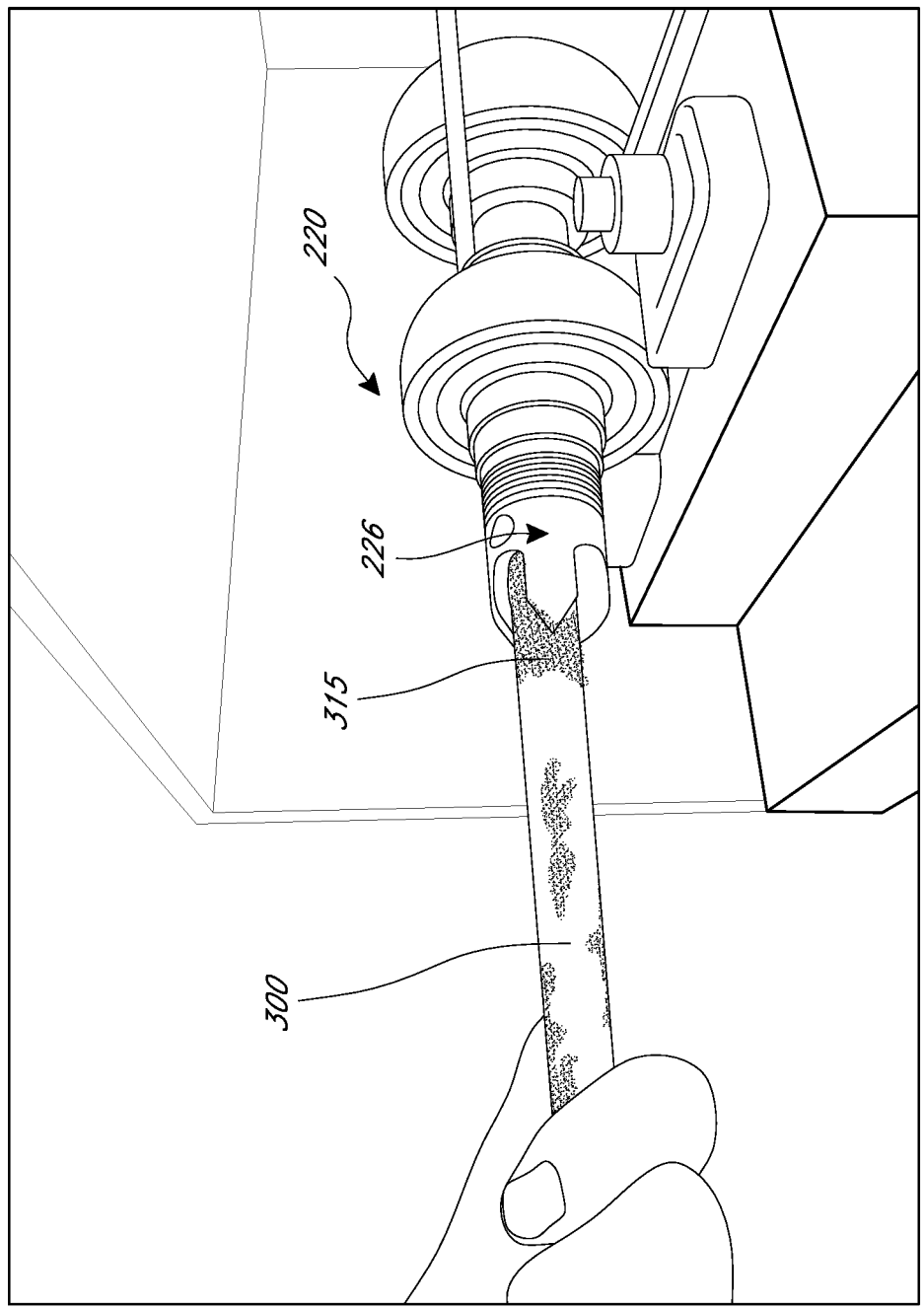
FIG. 13 is a perspective view of components in an embodiment of a system for modifying an assembly and a step in a method for modifying an assembly.

FIG. 12B shows a rod 300 with grip 310 being fed along the centering post 228 (not shown) and into engagement with a blade 226. The on/off switch (shown in FIG. 8) can be started to initiate rotation of the blade about the centering post 228. There may be a fixed speed or the speed of the blade can be varied as needed. For example, depending on the type of grip being removed various speeds may be better suited for grinding off the grip. In addition, a plastic reel seat may be removed better at a different speed than the removal of a cork or ethylene vinyl acetate grip. Thus, a user may wish to vary the speed during operation. In some embodiments the speed may be incrementally adjusted by user preference. The grip removal system may also include preset speeds which allow a user to select a speed based on the grip being removed. For example, there may be one preset speed for cork grips and a second preset speed for ethylene vinyl acetate grips. The speed may also have setting based on the grinding member selected for a particular rod. For example, a grinding member with blades 226 of a larger diameter may preferably be operated at a lower rotational speed than one with a smaller diameter.

Though shown being manually fed onto the rod, in some embodiments, the fishing pole may be held in a mechanical apparatus to ensure it does not move as it is fed against the rotating blades, as shown for example, in the embodiment of FIGS. 2-7 herein.

FIG. 12 shows a fishing pole rod 300 pulled back slightly after the grinding assembly has removed the majority of an old grip to expose residual grip 315. Though the centering post and blade combination has been selected to generally correspond to the particular rod being manipulated, there may be residual old grip 315 on the handle portion of the rod. This can ensure that the blade does not inadvertently remove a portion of the rod during the removal process. Undue excess old grip may be removed in subsequent steps. As shown, the shield may extend over the blade such that the blade is covered by the shield when viewed from above. In some embodiments, the blade may extend out from the shield.

Figure 14:
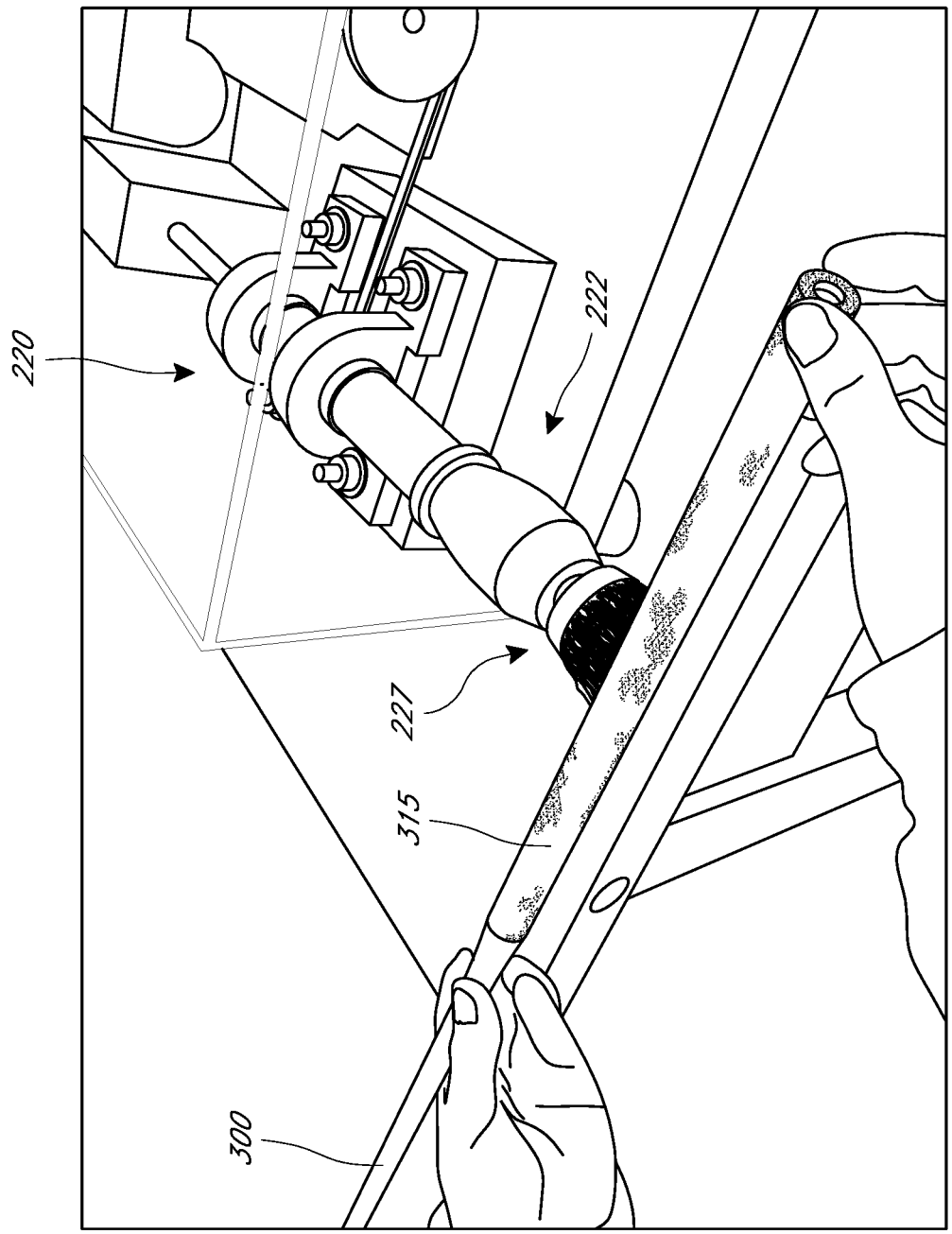
FIG. 14 is a perspective view of components in an embodiment of a system for modifying an assembly and a step in a method for modifying an assembly.

FIG. 14 shows another grinding member 222 attached to the grinding assembly. This grinding member 222 is a brush 227 and it is attached to the grinding assembly 220. In some embodiments, it is preferable to have the brush extend a distance away from the grinding assembly 220. For example, it may facilitate use if it extends several inches away from the assembly so that the shield, if rigidly attached to the system, does not interfere with the rod as the brush is used. The brush is configured to remove more of the residual old grip 315 from the rod 300. In some embodiments, it is preferable to remove most of the old grip so that the handle portion of the rod presents a generally smooth surface for application of the new grip. In some embodiments, the brush is not necessary and the blade removes enough of the old grip. In others, the brush is used to further clean the old grip from the rod. Some fishing rods will have a generally parallel shaft through the handle portion of the pole. Some other fishing rods may be slightly tapered such that the butt of the shaft is has the largest diameter. In such cases, the blade may grind away most of the grip from the butt end of the shaft, but not from further up the handle. The user may use the brush to remove the remainder of the old grip from the thinner portions of the handle. In some cases, where the new grip to be applied has a parallel internal configuration, the remaining portion of old grip may be left on the handle of the shaft to provide a surface for attaching the new grip. In some embodiments, the brush is steel, though other materials may be used including other metals and/or plastics.

Figure 15:
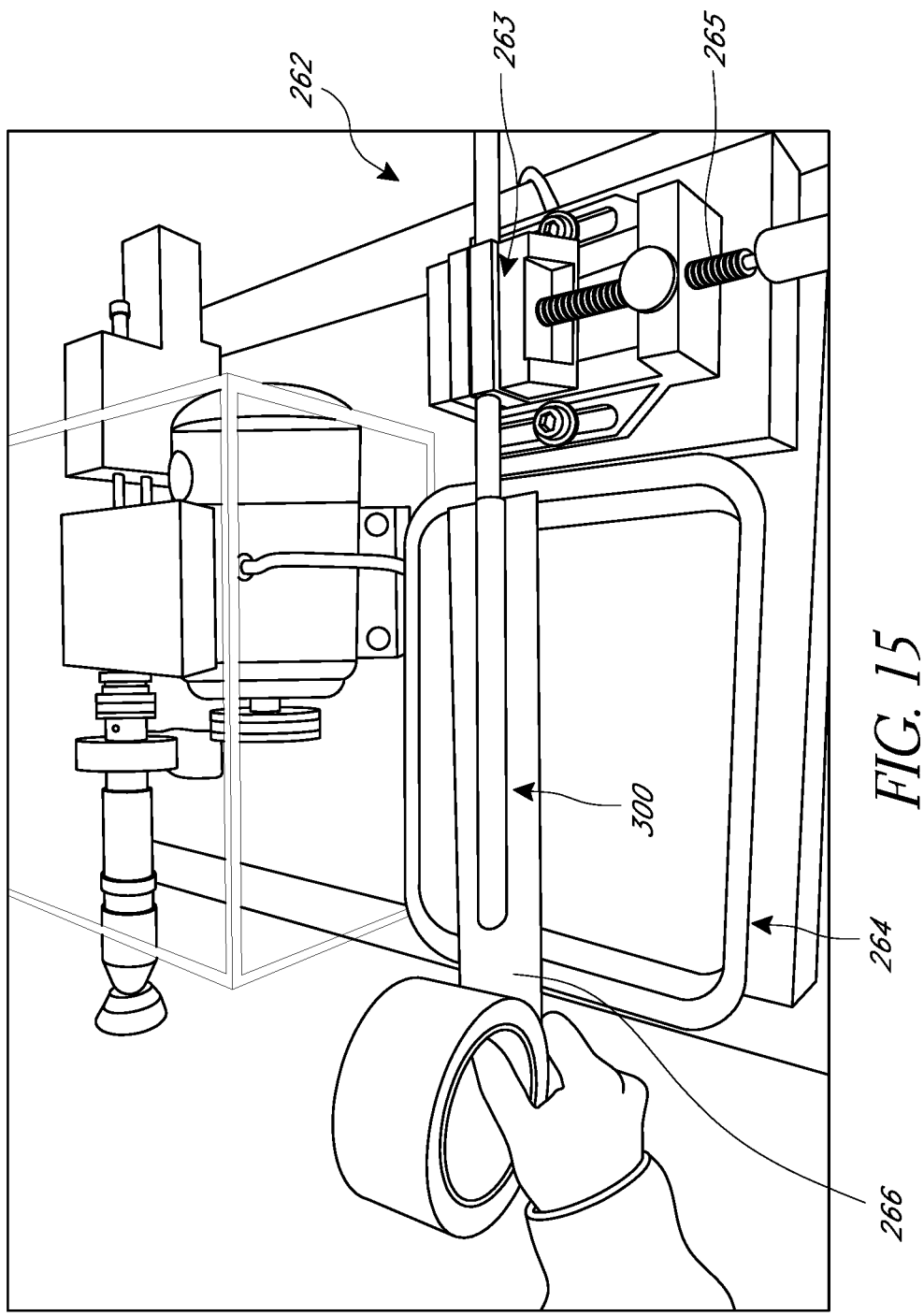
FIG. 15 is a perspective view of components in an embodiment of a system for modifying an assembly and a step in a method for modifying an assembly.

FIG. 15 shows a rod 300 attached to the mounting assembly of the mounting portion of the system. An adhesive agent is applied to the handle portion of the rod to secure a new grip thereto. In some embodiments, the adhesive agent is double sided tape 266 as shown in FIG. 15. The mounting portion shown in FIG. 14 includes a rod mount assembly 262 configured to secure a fishing rod over the catch basin while a new grip is applied. The rod mount assembly may include a rod clamp 263 secured on the shaft of a fishing rod by fastener 265. The double sided tape may be secured around the shaft of the fishing rod to ready the handle for application of a new grip.

Figure 16:
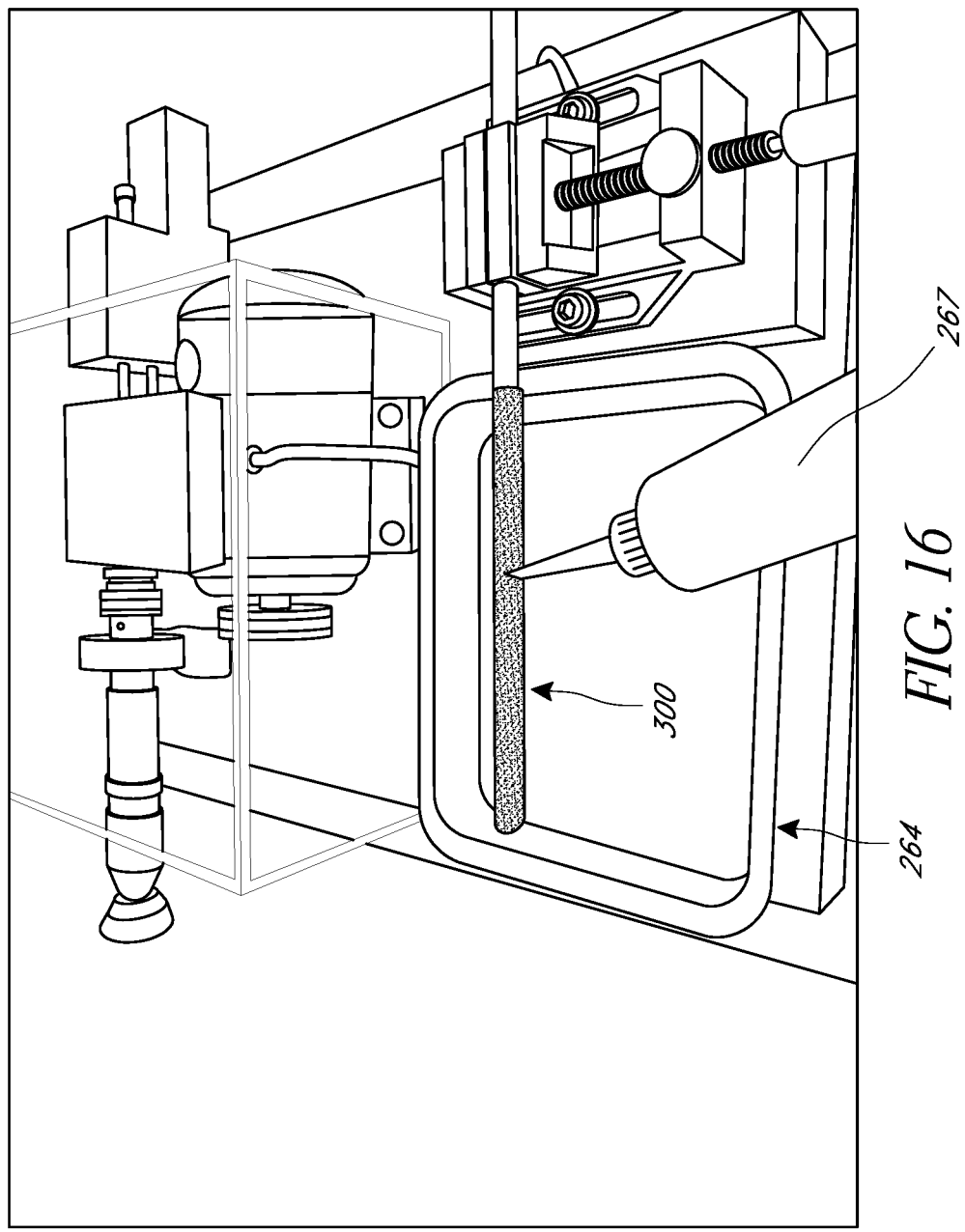
FIG. 16 is a perspective view of components in a system for modifying an assembly and a step in a method for modifying an assembly.

FIG. 16 shows the application of a lubricating solution 267 to the double sided tape to facilitate insertion of the handle portion of the rod into a new grip. In some embodiments, the lubricating solution 267 allows a new grip to be placed over the adhesive agent present on the double sided tape to allow proper positioning of the grip. When the lubricating solution 267 is absorbed and/or evaporates, the adhesive agent in the double sided tape secures the new grip onto the old handle. In some embodiments, instead of double sided tape, a separate adhesive agent may be placed on the shaft of the fishing pole to secure the new grip.

Figure 17:
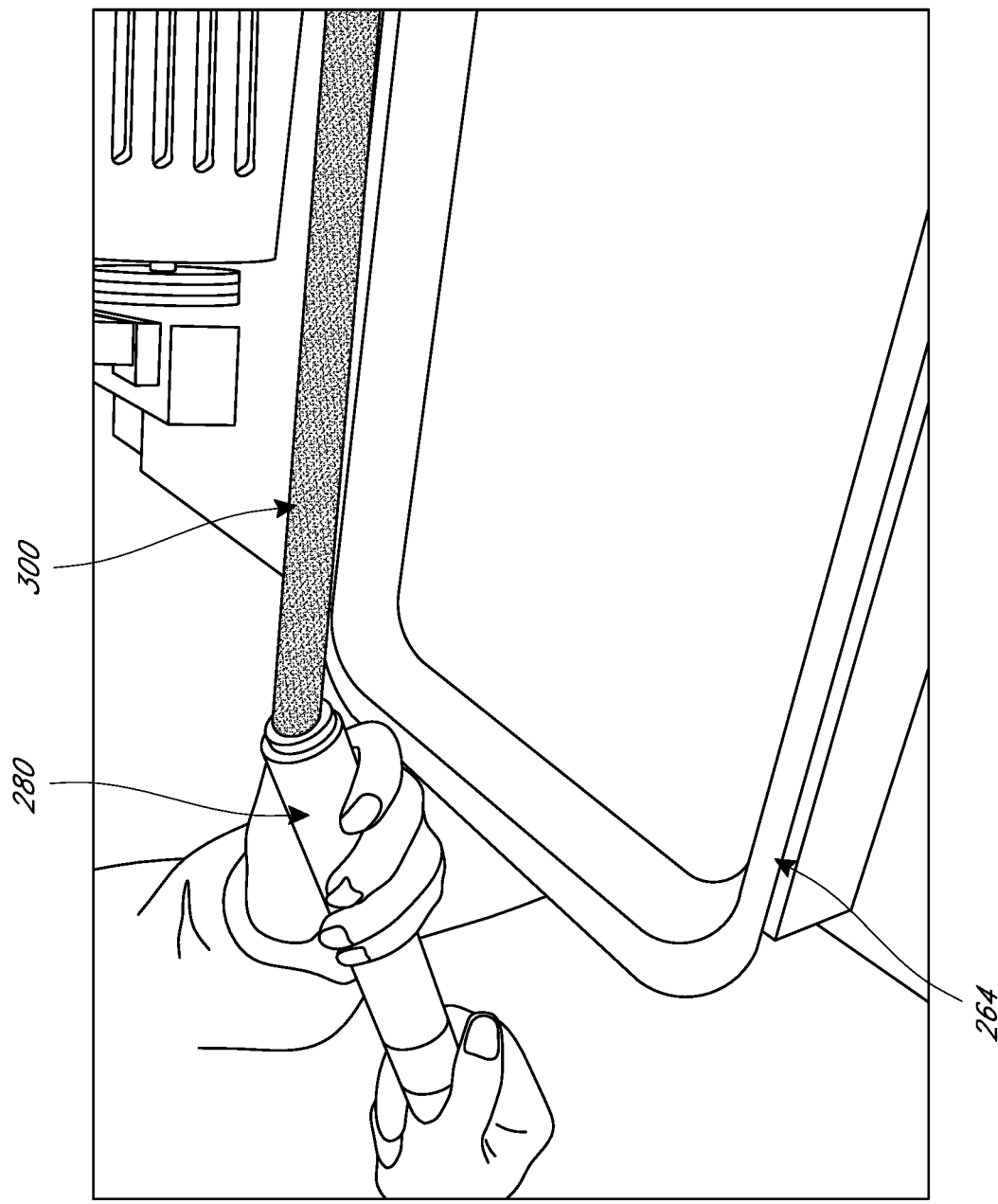
FIG. 17 is a perspective view of components in a system for modifying an assembly and a step in a method for modifying an assembly.
Figure 18:
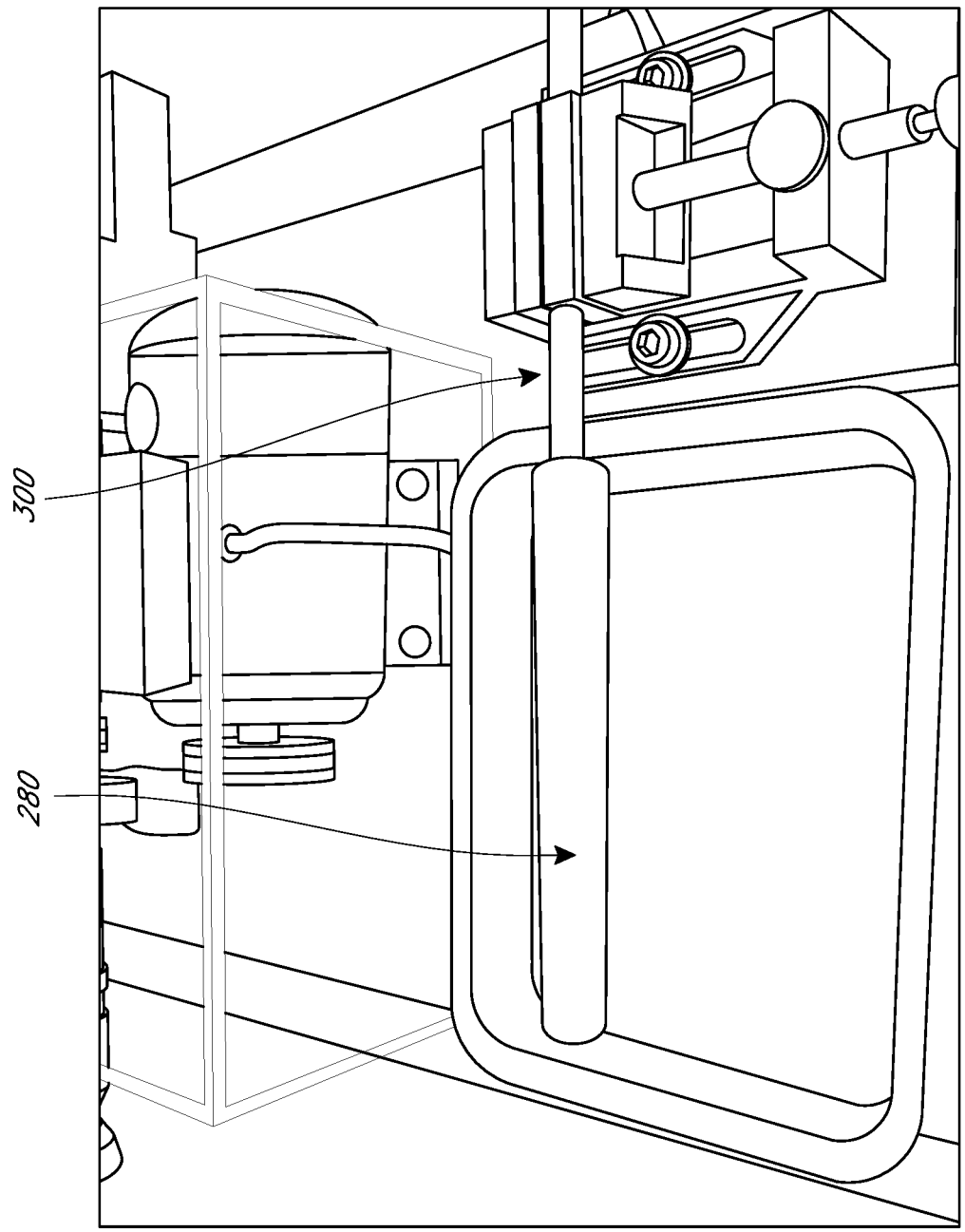
FIG. 18 is a perspective view a new grip applied to the handle portion of a rod according to certain embodiments.

FIG. 17 shows a new grip being 280 applied to the handle portion of a fishing rod 300. The grip 280 is initially angled to facilitate insertion of the rod into the end of the grip. As shown in FIG. 17, a grip may preferable be applied at a 45 degree angle to the shaft of the rod 300. In some embodiments, depending on the configuration of the shaft and the grip, other angles may be preferably chosen for applying the grip. For example, in some embodiments grips may be applied best at 15-30 degrees, 30-45 degrees, 45-60 degrees, or other angles. FIG. 18 shows a new grip 280 attached to the handle portion of a rod 300 that has had its old grip removed according to embodiments disclosed herein.

The various features and processes described above may be used independently of one another, or may be combined in various ways. All possible combinations and sub-combinations are intended to fall within the scope of this disclosure. In addition, certain methods or processes may be omitted in some implementations. The methods and processes described herein are also not limited to any particular sequence. For example, described the methods may be performed in an order other than that specifically disclosed, or multiple steps may be combined in a single step or may be performed in parallel with some other steps. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text or in the figures, the systems and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the systems and methods with which that terminology is associated.

What is claimed is:

1. A method of changing fishing pole grips, comprising:
removing an end portion of a mounted fishing pole grip from a fishing pole shaft to expose an end portion of the shaft of the fishing pole;
adjusting an inner diameter of a grinding member to be greater than an outer diameter of the end portion of the shaft of the fishing pole;
securing the shaft of the fishing pole between a first mounting portion aligned with a rear facing portion of the grinding member and a second mounting portion aligned with a forward facing portion of the grinding member, wherein the second mounting portion is spaced apart from the first mounting portion at least a distance from the end portion of the fishing pole past a grip portion of the fishing pole;
powering a rotational assembly to rotate the grinding member about an axis;
engaging the mounted fishing pole grip with the grinding member; and
advancing the shaft of the fishing pole through the grinding member to substantially remove the mounted fishing pole grip.

2. The method of claim 1 further comprising:
wrapping double sided tape around a handle portion of the shaft of the fishing pole after the mounted fishing pole grip has been substantially removed;
applying lubricant to the double sided tape wrapped around the handle portion of the fishing pole; and
sliding a replacement fishing pole grip onto the handle portion of the shaft of the fishing pole on top of the double sided tape.

3. The method of claim 2, wherein the double sided tape is wrapped around a residual portion of the mounted fishing pole grip.

4. The method of claim 1, wherein substantially removing the mounted fishing pole grip further comprises leaving a residual portion of the mounted fishing pole grip on a tapered portion of the shaft of the fishing pole such that an outer dimension of the residual portion of the mounted fishing pole grip forms a substantially cylindrical surface.

5. The method of claim 1, wherein securing the shaft of the fishing pole comprises:
mounting the exposed end portion of the shaft of the fishing pole on a centering post of the first mounting portion; and
fastening a front portion of the shaft of the fishing pole in a fastening mechanism of the second mounting portion.

6. The method of claim 5 further comprising adjusting a distance between the centering post and the fastening mechanism.

7. The method of claim 1, wherein adjusting the inner diameter of the grinding member further comprises tightening one or more grinding blades to be substantially adjacent to the outer diameter of the end portion of the shaft of the fishing pole.

8. The method of claim 1, further comprising removing a residual portion of the mounted fishing pole grip from the shaft of the fishing pole after a main portion of the fishing pole grip has been substantially removed.

9. A method of changing fishing pole grips, comprising:
powering a rotational assembly to rotate a first grinding member about a first axis;
engaging an end portion of a mounted fishing pole grip with the first grinding member to remove an end portion of the mounted fishing pole grip from a fishing pole and expose an end portion of a shaft of the fishing pole;
disengaging the end portion of the shaft of the fishing pole from the first grinding member;
stopping the rotational assembly;
adjusting an inner diameter of a second grinding member to be greater than an outer diameter of the end portion of the shaft of the fishing pole;
securing the shaft of the fishing pole between a first mounting portion aligned with a rear facing portion of the second grinding member and a second mounting portion aligned with a forward facing portion of the second grinding member, wherein the second mounting portion is spaced apart from the first mounting portion at least a distance from the end portion of the fishing pole past a grip portion of the fishing pole;
powering the rotational assembly to rotate the second grinding member about a second axis;
engaging the mounted fishing pole grip with the second grinding member; and
advancing the shaft of the fishing pole through the second grinding member to substantially remove the mounted fishing pole grip.

10. The method of claim 9, the first grinding member further comprising an inner grinding portion having an outer diameter smaller than an inner diameter of the shaft of the fishing pole.

11. The method of claim 10, wherein engaging the end portion of the mounted fishing pole grip with the first grinding member comprises engaging the end portion of the mounted fishing pole grip with the inner grinding portion of the first grinding member.

12. The method of claim 11, wherein engaging the end portion of the mounted fishing pole grip with the inner grinding portion of the first grinding member exposes the inner diameter of the end portion of the shaft of the fishing pole.

13. The method of claim 10, the first grinding member further comprising an outer grinding portion having an inner diameter larger than an outer diameter of the fishing pole.

14. The method of claim 13, wherein engaging the end portion of the mounted fishing pole grip with the first grinding member comprises engaging the end portion of the mounted fishing pole grip with the outer grinding portion of the first grinding member.

15. The method of claim 14, wherein engaging the end portion of the mounted fishing pole grip with the outer grinding portion of the first grinding member exposes the outer diameter of the end portion of the shaft of the fishing pole.

16. The method of claim 13 wherein the inner grinding portion and the outer grinding portion are coupled together to rotate about the first axis.

17. The method of claim 9 further comprising:
wrapping double sided tape around a handle portion of the shaft of the fishing pole after the mounted fishing pole grip has been substantially removed;
applying lubricant to the double sided tape wrapped around the handle portion of the fishing pole; and
sliding a replacement fishing pole grip onto the handle portion of the shaft of the fishing pole on top of the double sided tape.

18. The method of claim 9, wherein securing the shaft of the fishing pole comprises:
mounting the exposed end portion of the shaft of the fishing pole on a centering post of the first mounting portion; and
fastening a front portion of the shaft of the fishing pole in a fastening mechanism of the second mounting portion.

19. The method of claim 18 further comprising adjusting a distance between the centering post and the fastening mechanism.

20. The method of claim 9, wherein adjusting the inner diameter of the second grinding member further comprises tightening one or more grinding blades to be substantially adjacent to the outer diameter of the end portion of the shaft of the fishing pole.

* * * * *